United States Patent [19]

Terada et al.

[11] Patent Number: 4,630,132
[45] Date of Patent: Dec. 16, 1986

[54] VIDEO SIGNAL RECORDING/REPRODUCING APPARATUS

[75] Inventors: Toshimichi Terada, Chigasaki; Noboru Kojima, Yokohama; Akira Shibata, Katsuta, all of Japan

[73] Assignee: Hitachi, Ltd., Tokyo, Japan

[21] Appl. No.: 559,086

[22] Filed: Dec. 7, 1983

[30] Foreign Application Priority Data

Dec. 8, 1982 [JP]  Japan .................. 57-214007
Dec. 9, 1982 [JP]  Japan .................. 57-214677

[51] Int. Cl.$^4$ .................. H04N 9/493; H04N 5/78
[52] U.S. Cl. .................. 358/310; 358/328; 360/9.1; 360/21
[58] Field of Search .............. 358/310, 327, 328, 335, 358/340; 360/8, 9.1, 18, 21, 22, 33.1, 55

[56] References Cited

U.S. PATENT DOCUMENTS

| | | | |
|---|---|---|---|
| 4,177,481 | 12/1979 | Yamagiwa et al. | 358/328 X |
| 4,208,673 | 7/1977 | Numakura | 358/328 X |
| 4,290,082 | 9/1981 | Hirai | 358/328 |
| 4,551,771 | 11/1985 | Machida et al. | 358/343 X |

Primary Examiner—Robert L. Richardson
Attorney, Agent, or Firm—Antonelli, Terry & Wands

[57] ABSTRACT

A helical scan type magnetic recording/reproducing apparatus in which a magnetic tape is guided helically around a rotary magnetic head assembly over an angular range approximating to 360°. Two magnetic heads are disposed relatively closely to each other at an angle smaller than 180°. The rotary magnetic heads assembly performs a single complete rotation for a unit period, for example, one field period. In recording, video signal of the unit period undergoes time axis compression to be compressed to a period corresponding to a scanning period of the heads during which the magnetic heads are in contact with the magnetic tape in each rotation of the head assembly and supplied to alternately the magnetic heads which are so designed that the azimuth angles of the respective gaps differ from each other. Alternatively, the video signal is separated into a luminance signal and a chrominance signal, wherein the former is supplied to one of the magnetic heads while the latter is simultaneously supplied to the other.

9 Claims, 36 Drawing Figures

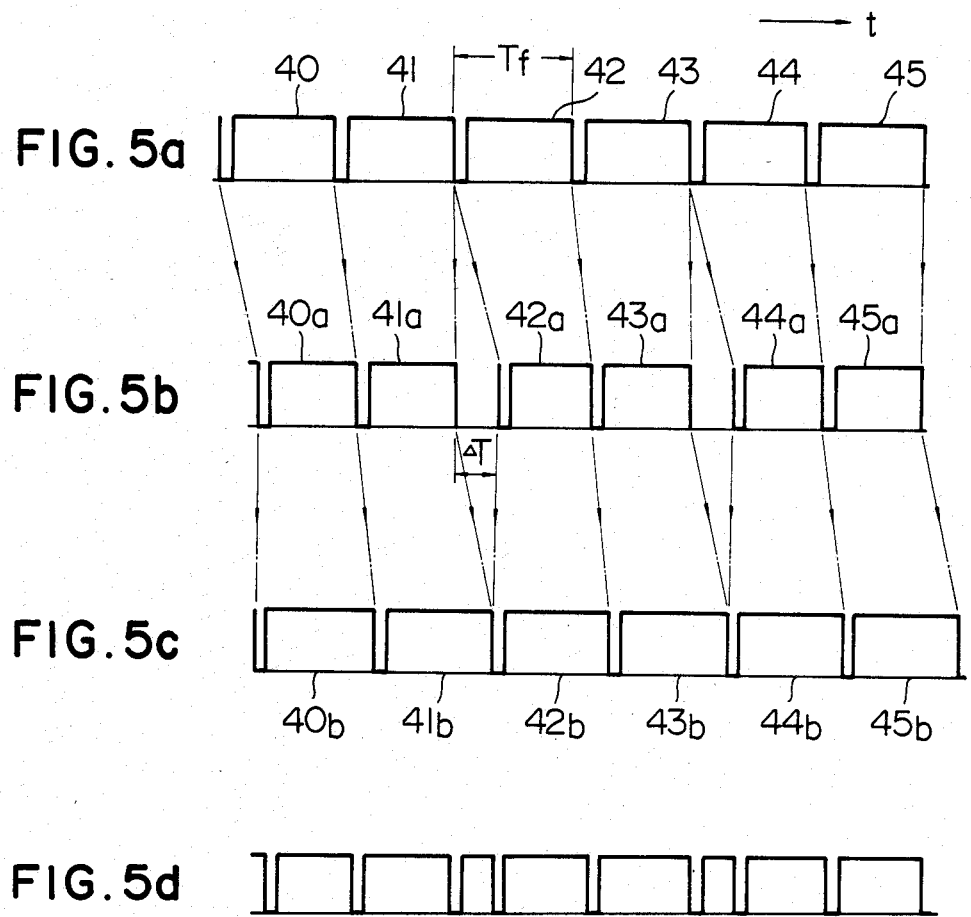

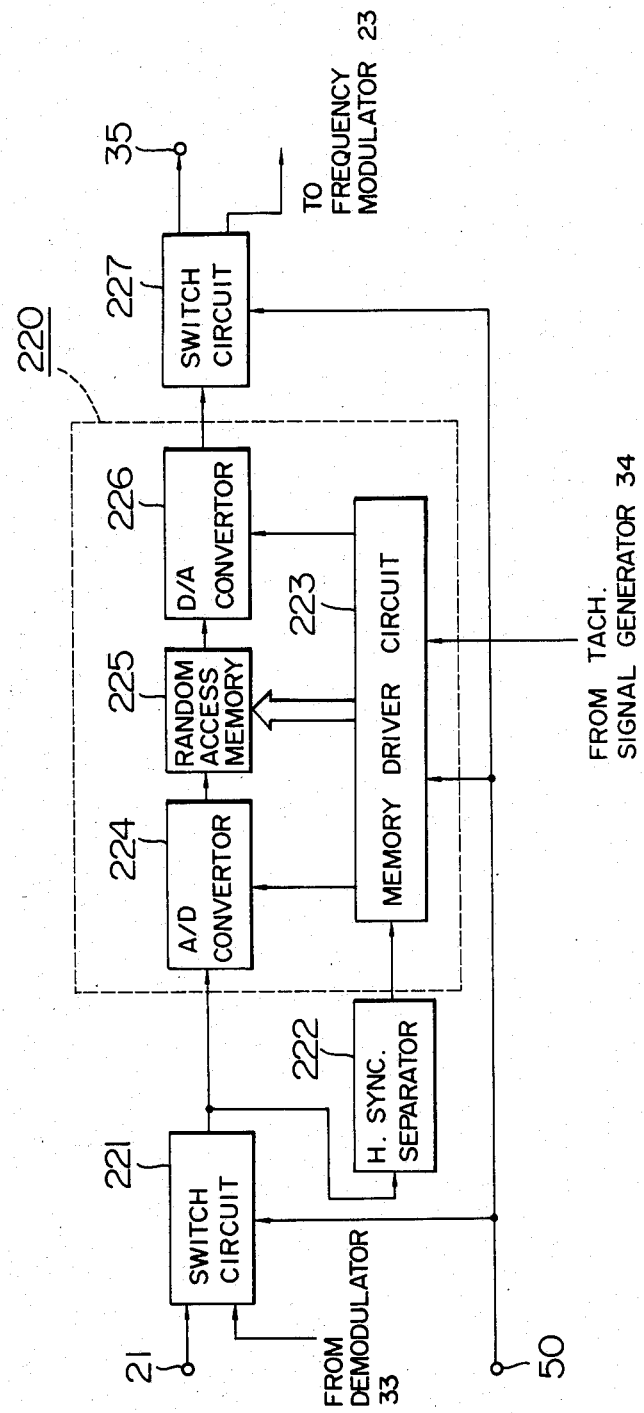

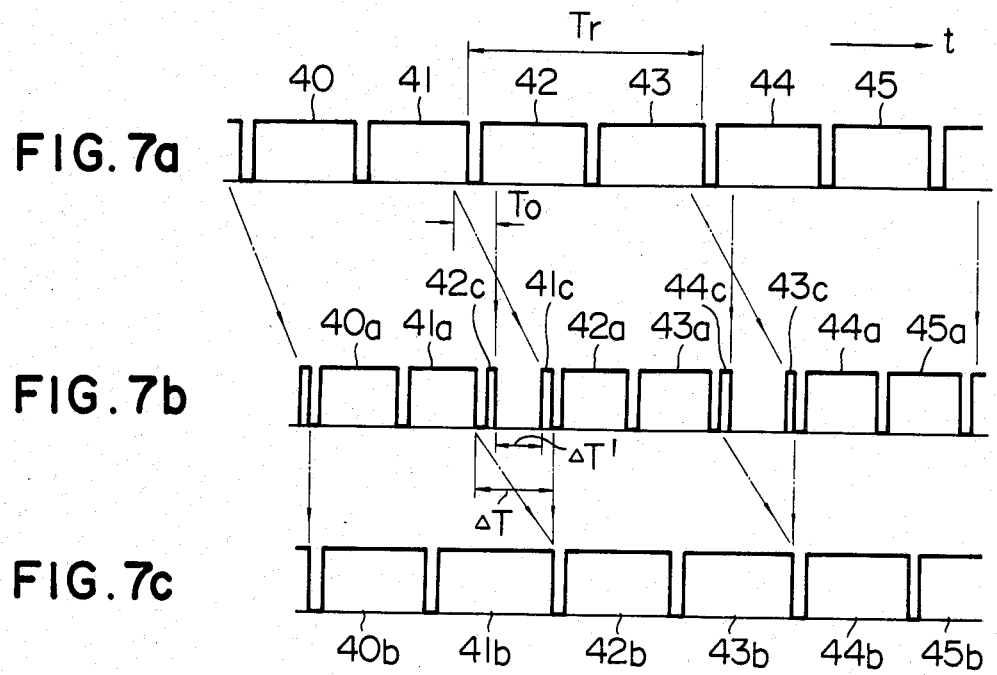
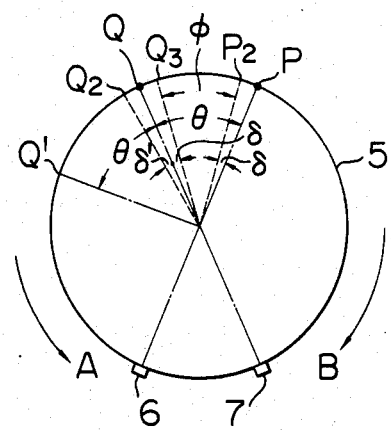

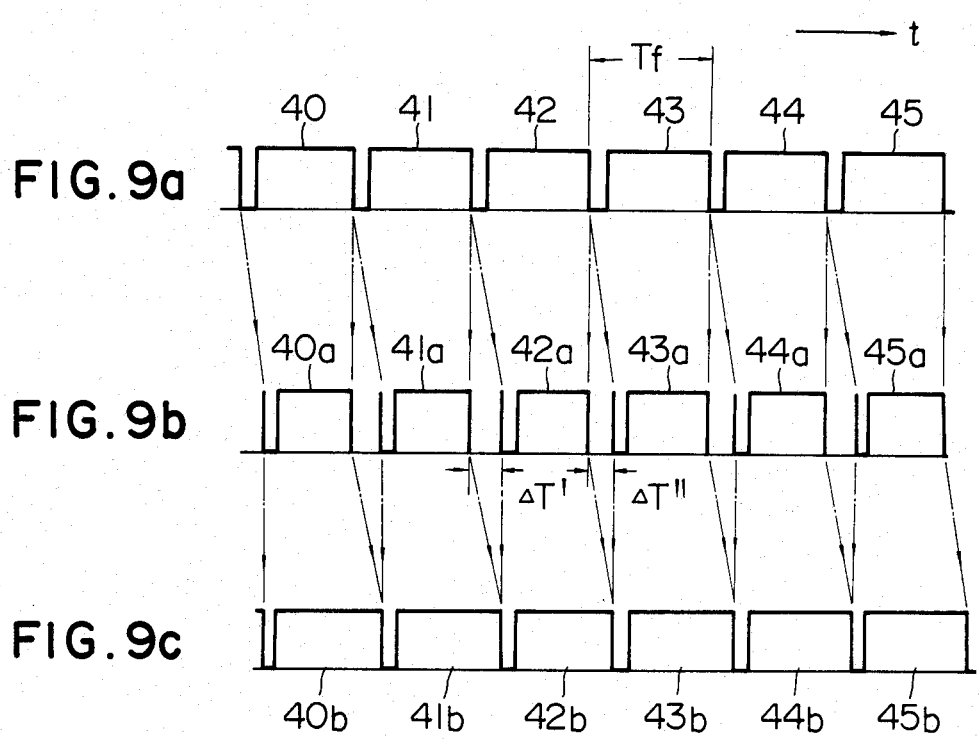

FIG.16
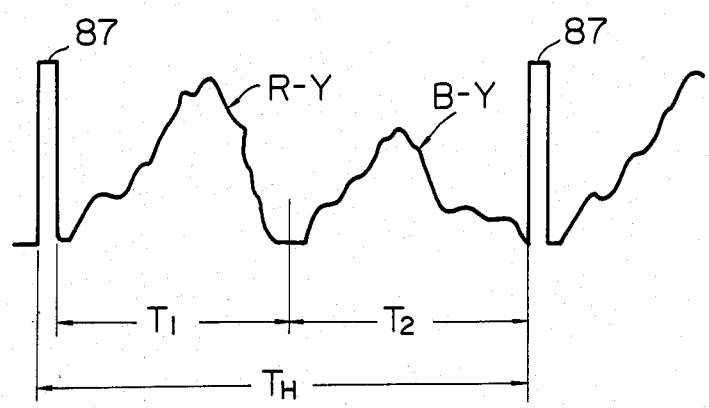
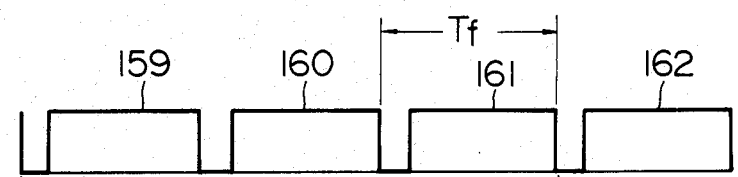
FIG.18a
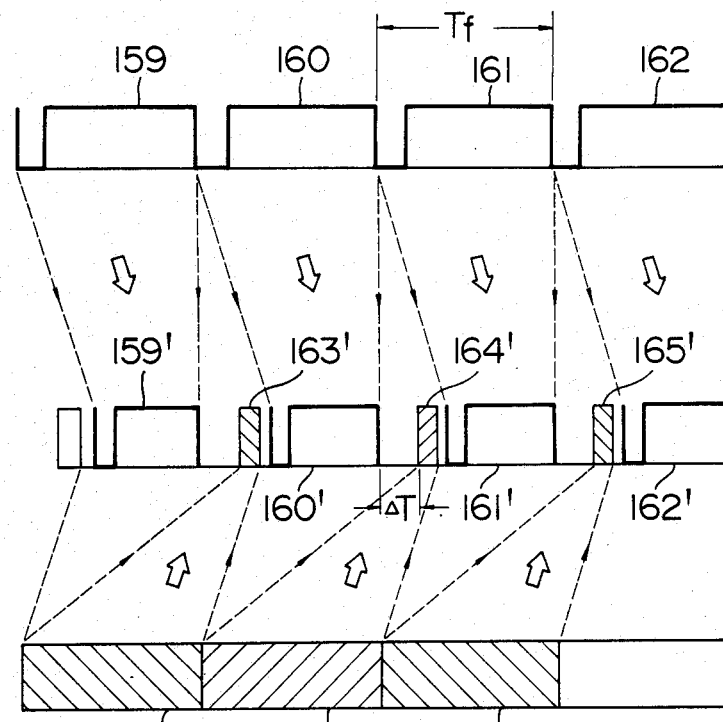
FIG.18b
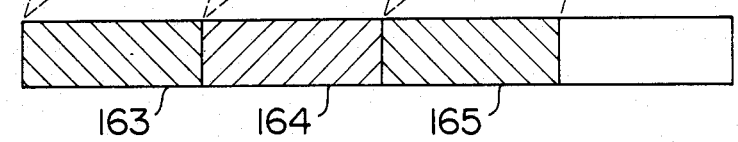
FIG.18c

FIG. 19
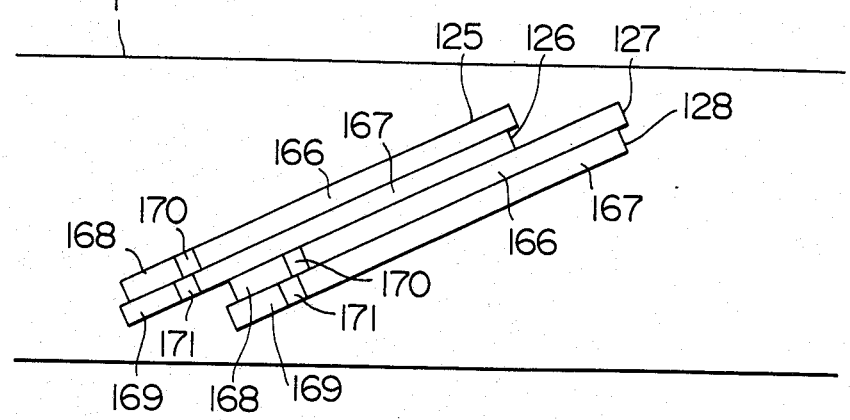
FIG. 20a
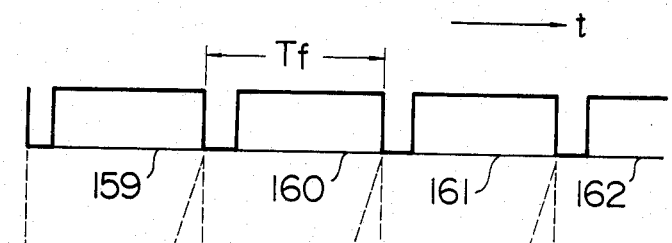
FIG. 20b
FIG. 20c
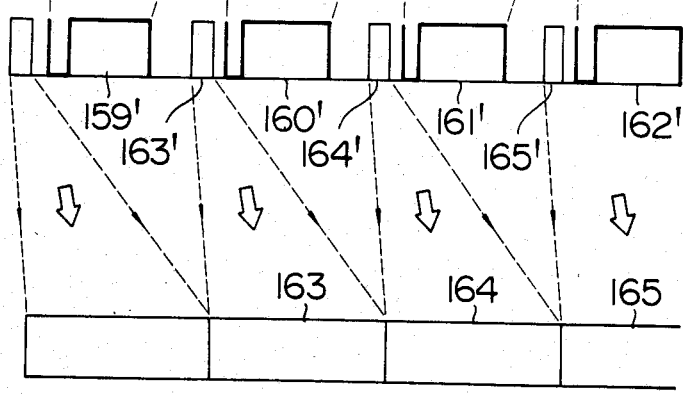

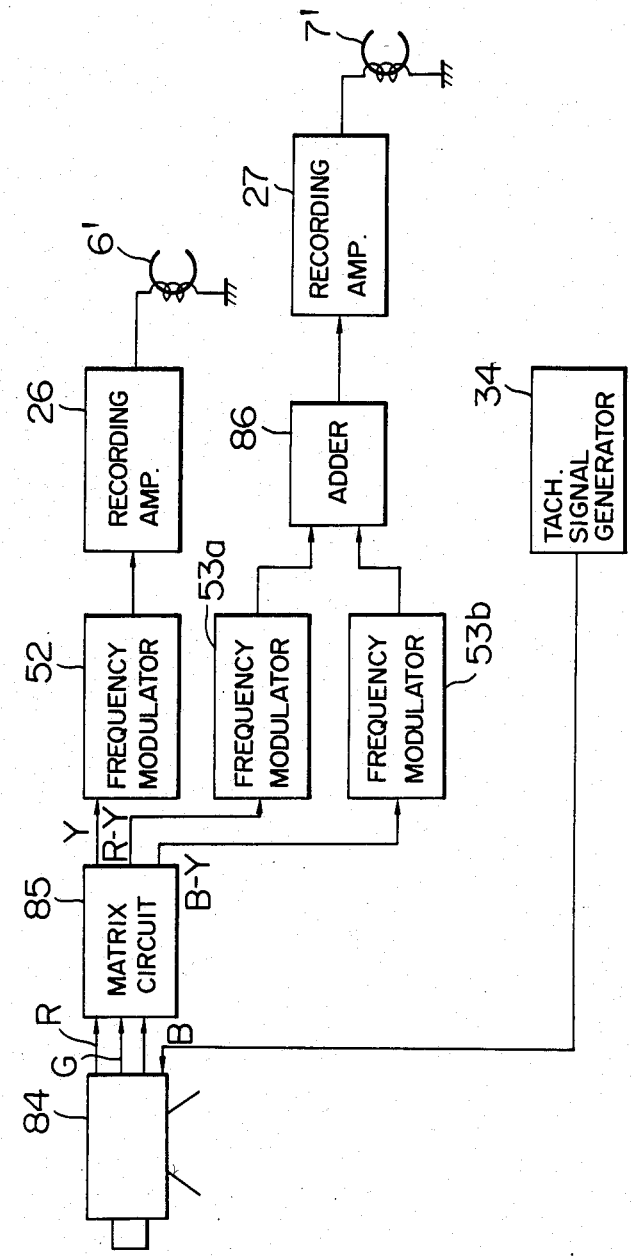

VIDEO SIGNAL RECORDING/REPRODUCING APPARATUS

The present invention in general relates to a video signal recording/reproducing apparatus, and in particular to a helical scan type video signal recording/reproducing apparatus of a reduced size which is capable of recording video signal at an increased density.

As a video signal recording/reproducing apparatus, the helical scan type magnetic recording/reproducing apparatus for domestic use enjoys increasing popularization. In such magnetic recording/reproducing apparatus, two magnetic heads scan alternately a magnetic tape slantwise for recording a video signal on a field-by-field basis through each of the magnetic heads in an alternating manner. As a result of development of the magnetic head having high performance, a reproduced image of high quality can be obtained. Further, because of the azimuth recording system as adopted, the recording of the video signal can be accomplished with a significantly increased density.

In the recent years, the technological approach for combining integrally the helical scan type magnetic recording/reproducing apparatus with a video camera attracts a great concern. As fundamental requirements for accomplishing such an integral combination, the helical scan type magnetic recording/reproducing apparatus should desirably be realized in small size and with a light weight while assuring a high quality of the reproduced image.

In order to satisfy the requirements mentioned above, it will be most preferable to increase the number of rotations of the head cylinder or drum to thereby correspondingly increase the relative speed between the magnetic head and the magnetic tape for a given recording density, and make possible use of a magnetic head cylinder or assembly having a reduced size. However, in the case of the two-head helical scan type magnetic recording/reproducing apparatus, the increasing of the relative speed means a corresponding increase in the diameter of the head cylinder, involving a large size of the apparatus, which is a disadvantage, although the image quality can be improved.

In contrast, in the case of a one-head helical scan type magnetic recording/reproducing apparatus, the relative speed between the magnetic head and the magnetic tape can be increased about twice as high as the relative speed in the two-head helical scan type apparatus, when the diameter of the head cylinder of the former is selected to be equal to that of the head cylinder of the latter, provided that the head cylinder is rotated at a period corresponding to one field of the video signal. Further, when the relative speed between the magnetic head and the magnetic tape is made equal to that of the two-head helical scan type magnetic recording/reproducing apparatus, it is possible to decrease the diameter of the head cylinder to a half, to allow the apparatus to be realized in a reduced size, whereby the requirements concerning the high quality of the reproduced image and implementation in small size and light weight can thus be satisfied. The same holds true in application to a so-called 1.5-head helical scan type magnetic recording/reproducing apparatus for broadcasting uses in which an auxiliary head is provided for recording and reproducing the vertical blanking period of the video signal.

Although the one-head or 1.5-head helical scan type magnetic recording/reproducing apparatus satisfies the aforementioned requirements to a reasonable degree, it is impossible to adapt the azimuth recording system because the magnetic tape is sequentially scanned by one and the same magnetic head. As a consequence, it is indispensable to dispose guard bands between the record tracks, which results in a corresponding decrease in the recording density, being accomplished with an undue increase in the amount of magnetic tape which is used. This is undesirable particularly in the magnetic recording/reproducing apparatus for home use.

An object of the present invention is to provide a video signal recording/reproducing apparatus of the helical scan type which is capable of reproducing pictures with an improved image quality and which can be realized in a reduced size and weight while assuring a high recording density.

In view of the above object, there is provided according to an aspect of the invention a helical scan type magnetic recording/reproducing apparatus which includes a rotary head assembly or unit having two magnetic heads disposed with a predetermined angular distance there between which is smaller than 180 degrees or alternatively disposed closely to each other, the magnetic heads having respective gaps of azimuth angles which differ from each other. The magnetic heads are rotated at a speed corresponding to a unit period of the video signal, whereby the video signal of the unit period is compressed in respect to the time axis or base band recorded during a period which substantially corresponds to a period during which the magnetic heads are brought into contact with the magnetic tape in each complete rotation of the head. Control is performed in such a manner that the pair of magnetic heads are periodically changed over to record alternately the video signal for each unit period, respectively. Alternatively, the video signal is separated into a luminance signal and a color or chrominance signal, the former being supplied to one of the magnetic heads with the latter supplied to the other head to be simultaneously recorded. The above mentioned unit period may be selected to be equal to, for example, a one-field period.

In the magnetic recording/reproducing apparatus according to the invention, it is unnecessary to provide the guard bands, whereby a high density recording can be accomplished by virtue of the fact that the signal recording is performed by the pair of magnetic heads having mutually different azimuth angles on the adjacent record tracks. Further, since the rotating speed of the magnetic heads can be increased as compared with the head speed of the two-head helical scan type recording/reproducing apparatus, the diameter of the rotary head assembly can be correspondingly decreased. Thus, the magnetic video signal recording/reproducing apparatus of small size and light weight can advantageously be accomplished.

The present invention will be apparent from the following detailed description taken in conjuction with the accompanying drawings, in which:

FIGS. 5a to 5d show timing charts for illustrating operation of the recording/reproducing circuit shown in FIG. 4;

FIG. 6 shows in a block diagram an exemplary embodiment of a time axis conversion circuit used in the magnetic recording/reproducing apparatus according to the invention;

FIGS. 7a to 7c show timing diagrams for illustrating another aspect of operation performed by the magnetic recording/reproducing apparatus shown in FIG. 4;

FIG. 8 is a view showing rotational phases or timing of magnetic heads for illustrating the operation together with FIGS. 7a to 7c;

FIGS. 9a to 9c show timing diagrams for illustrating still another aspect of operation of the magnetic recording/reproducing apparatus shown in FIG. 4;

FIG. 16 is a waveform diagram showing an example of the color signal recorded by the circuit shown in FIG. 15;

FIGS. 18a to 18c show timing diagrams for illustrating, by way of example, operation of the circuit shown in FIG. 17 for recording a luminance signal and a left-channel signal of stereophonic sound;

FIG. 19 is a view showing a pattern of record tracks formed through the recording operation illustrated in FIG. 18;

FIGS. 20a to 20c are timing diagrams for illustrating operation for reproducing the signals recorded in the manner illustrated in FIGS. 18a to 18c; and FIG. 21 is a block diagram showing a combination of a video camera and a recording circuit according to a further embodiment of the invention.

Figure 1:
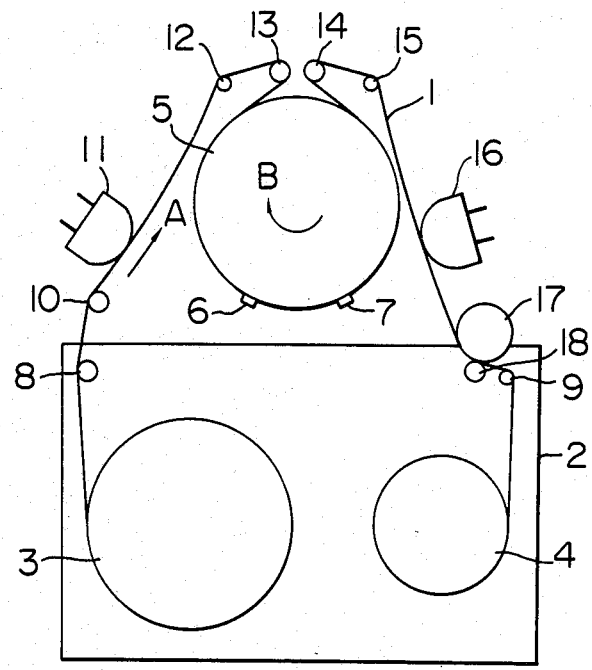
FIG. 1 is a view for schematically illustrating a magnetic tape feeding mechanism used in a video signal recording/reproducing apparatus according to the present invention.

Now, the invention will be described in detail in conjunction with the preferred embodiments thereof by referring to the drawings.

FIG. 1 is a top plan view showing schematically an arrangement of a magnetic tape feeding mechanism of a video signal recording and reproducing apparatus according to an embodiment of the invention. In the figure, the apparatus is shown in the state in which a tape cassette 2 is placed therein with the apparatus being ready for recording or reproducing (replay or playback) operation. A reference numeral 5 denotes a rotary head assembly which is composed of a tape guide of a cylindrical or drum-like configuration and magnetic heads mounted rotatably along the cylindrical surface of the tape guide drum. More specifically, the rotary head assembly may be constituted, for example, by a stationary or fixed cylinder, a rotatable cylinder disposed coaxially with the fixed cylinder and supported rotatably, and magnetic heads fixedly mounted on the rotatable cylinder at the side opposing to the fixed cylinder. Alternatively, the rotary head assembly may be constituted by a pair of stationary fixed cylinders disposed coaxially with each other with a small gap being interposed therebetween, and rotatable magnetic heads which project outwardly slightly from the gap.

In the tape cassette 2 which is not in the state placed in the magnetic recording/reproducing apparatus, a magnetic tape 1 extends from a supply reel 4 by way of a tape guide 8 disposed at the exit side and a tape guide 9 disposed at the entry side. When the tape cassette 2 is placed in the magnetic recording/reproducing apparatus which is subsequently set to a recording or playback mode, movable tape guides 12, 13, 14 and 15 cooperate to lead outwardly the magnetic tape 1 from the tape cassette 2 to wind the magnetic tape 1 helically around the rotary head assembly 5 at a wrap angle of more or less about 360° (e.g. ca. 300°). At the same time, the magnetic tape 1 is caused to bear on an erasing head 11 and a voice control head 16 and sandwiched between a pinch roller 17 and a capstan 18 under a predetermined tension applied by a tensioning post 10.

The magnetic tape 1 travels in the direction indicated by an arrow A as driven by the capstan 18 and the pinch roller 17, while the magnetic heads 6 and 7 of the rotary head assembly 5 are rotated in the direction indicated by an arrow B, whereby recording or reproduction is effected by the magnetic heads 6 and 7 alternately changed over for every rotation.

Figure 2A:
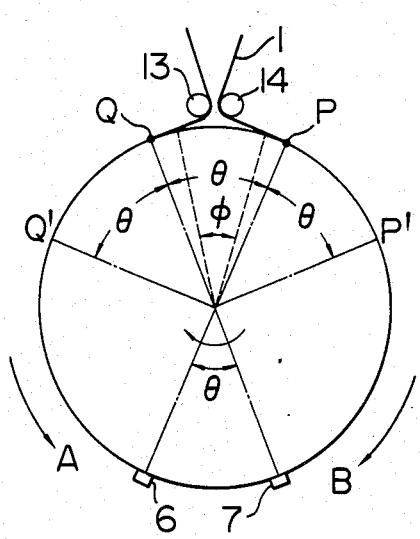
FIGS. 2a and 2b show in detail a structure of a rotary head assembly of the recording/reproducing apparatus shown in FIG. 1 in a plan view and an elevational view, respectively.
Figure 2B:
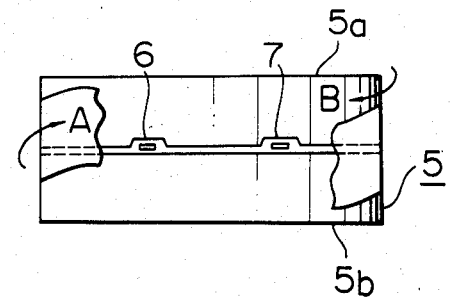

FIGS. 2a and 2b show a typical structure of the rotary head assembly 5 in a plan view and an elevational view, respectively. In the figures, a reference symbol 5a denotes a rotatable upper cylinder, while 5b denotes a stationary lower cylinder. Parts corresponding to those shown in FIG. 1 are denoted by same reference numerals.

Referring to FIGS. 2a and 2b, the magnetic tape 1 is helically wound around the outer periphery of the rotary head assembly 5 at a wrap angle 360° minus $\phi$°. The range of this wrap angle is determined by the tape guides 13 and 14. The upper cylinder or drum 5a is rotated in the direction indicated by the arrow B, while the magnetic tape 1 travels in the direction indicated by the arrow A.

The magnetic heads 6 and 7 having respective gaps of azimuth angles differing from each other are mounted on the rotatable upper cylinder 5a with an offset of a value approximately equal to the pitch P of the record tracks (not shown) multiplied by $\theta°/360°$ in the direction of the axis of rotation of the upper cylinder 5a and at an angular distance of $\theta°$ between the heads 6 and 7. In this connection, it is noted that the angle $\theta°$ is selected to be slightly greater than the angle $\phi°$ mentioned above. The upper cylinder 5a and hence the magnetic heads 6 and 7, are adapted to perform a single complete rotation in a period corresponding to one field of the video signal in a standard system. In the case of NTSC system, by way of example, the upper cylinder 5a is rotated at an angular speed of 3600 rpm.

In the case of the embodiment being described, the recording or reproduction is effected by the magnetic heads 6 and 7, which are alternately changed over with respect to each other for each of the successive rotations of the rotary head assembly 5. The recording or reproducing operation takes place in an angular range of $(360°-\theta°)$ extending from a point P to a point Q in which range the magnetic heads 6 and 7 are brought into contact with the magnetic tape 1 for scanning the latter, where $\theta°$ represents an angular range extending from the point Q to the point P and including the angular range defined by the angle $\phi°$ in which the magnetic tape 1 is out of contact with the rotary head assembly 5. In the recording operation, the magnetic heads 6 and 7 are, respectively, supplied with one field of the video signal during each rotation of the head assembly 5 in an alternating manner. On the other hand, in the replay operation, one field of the video signal is picked up by the magnetic heads 6 and 7 alternately for reproduction during each of successive rotations of the head assembly 5, respectively.

Figure 3:
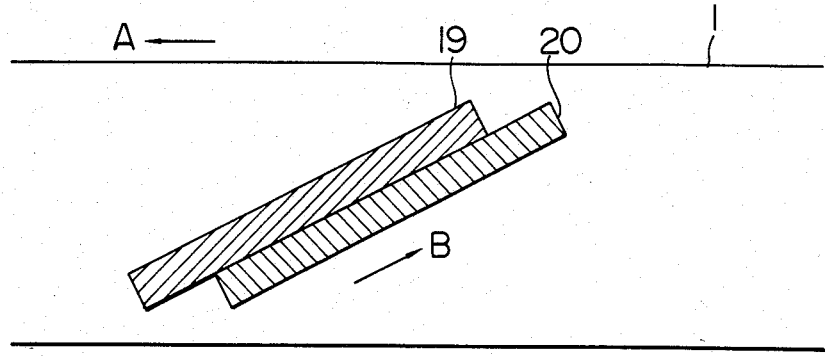
FIG. 3 is a view for illustrating a pattern of record tracks formed on a magnetic tape.

Describing more specifically in this connection, the magnetic head 6 is supplied with one field of the video signal during the period in which the magnetic head 6 travels from the point P to the point Q as the rotary magnetic head assembly 5 performs a single rotation, whereby a record track 19 illustrated in FIG. 3 is produced. At the moment the magnetic head 6 has reached the point Q, the recording operation is stopped. Subsequently, when the magnetic head 7 has attained the point P, the latter is supplied with the video signal of the succeeding field, the recording of which is stopped at the point Q, whereby a record track 20 shown in FIG. 3 is formed. In this way, the magnetic heads 6 and 7 are alternately brought into the recording state in the angular range defined between the points P and Q in each of successive rotations of the magnetic head assembly, whereby the record tracks containing video information are alternately formed on a field-by-field basis through the alternate recording operations of the magnetic heads 6 and 7, respectively.

As described hereinbefore, the magnetic heads 6 and 7 have respective head gaps of azimuth angles which differ from each other. Accordingly, the record tracks formed by the magnetic heads 6 and 7, respectively, can be so realized that both tracks are partially superposed onto each other. As a result of this, the record track can be produced with a width smaller than that of the gap of the magnetic heads 6 and 7, rendering it unnecessary to provide the guard band to thereby allow the recording density to be significantly increased.

In the reproducing or playback operation, the magnetic heads 6 and 7 are caused to scan, respectively, the record tracks having directions of magnetization matching the respective azimuth angles in the course of travel from the point P to the point Q through the tracking control technique employed in the hitherto known recording/reproducing apparatus of the two-head helical scan type. Since the width of the record track is narrower than the gap width of the magnetic head (6,7), the latter will also scan a part of the adjacent record track simultaneously. However, reproduction of the video signal from the adjacent track is effectively supressed due to the azimuth loss. Further, even when the magnetic head (6, 7) is displaced more or less in the direction widthwise of the relevant record track, the reproduced output signal is prevented from being degraded.

By the way, when the period of one field of the video signal in the standard system is represented by $T_f$, the magnetic head (6, 7) is periodically rotated at a frequency corresponding to $T_f$, whereby the recording or reproduction of the video signal of one field is carried out during a time span from the point P to the point Q, i.e. for the time given by $T_f(360°-\theta°/360°)$. Accordingly, for the recording operation, the standard video signal must be compressed in respect of the time base or axis thereof by a factor of $(360°-\theta°/360°)$. On the other hand, upon reproduction, the reproduced video signal has to be expanded in respect of the time axis by a factor of $360°/(360°-\theta°)$. Additionally, it should be mentioned that when the magnetic head 7 has attained the point Q starting from the point P, the magnetic head 6 has reached the point P. However, when the magnetic head 6 has subsequently reached the point Q starting from the point P, the magnetic head 7 is still on the way to the point Q. In order that the magnetic head 7 reaches the point P, the head 7 has to be further rotated by $2\theta°$. In this way, the magnetic heads 6 and 7 differ from each other as to the chronographical position in the recording or reproducing period extending from the point P to the point Q in each rotation of the magnetic head assembly 5. For these reasons, there is required means for establishing the timing at which the video signal of one field is supplied to the magnetic heads 6 and 7 in the recording operation and/or means for establishing continuity between the video signals produced by the magnetic heads 6 and 7, respectively, in the reproducing operation.

Figure 4:
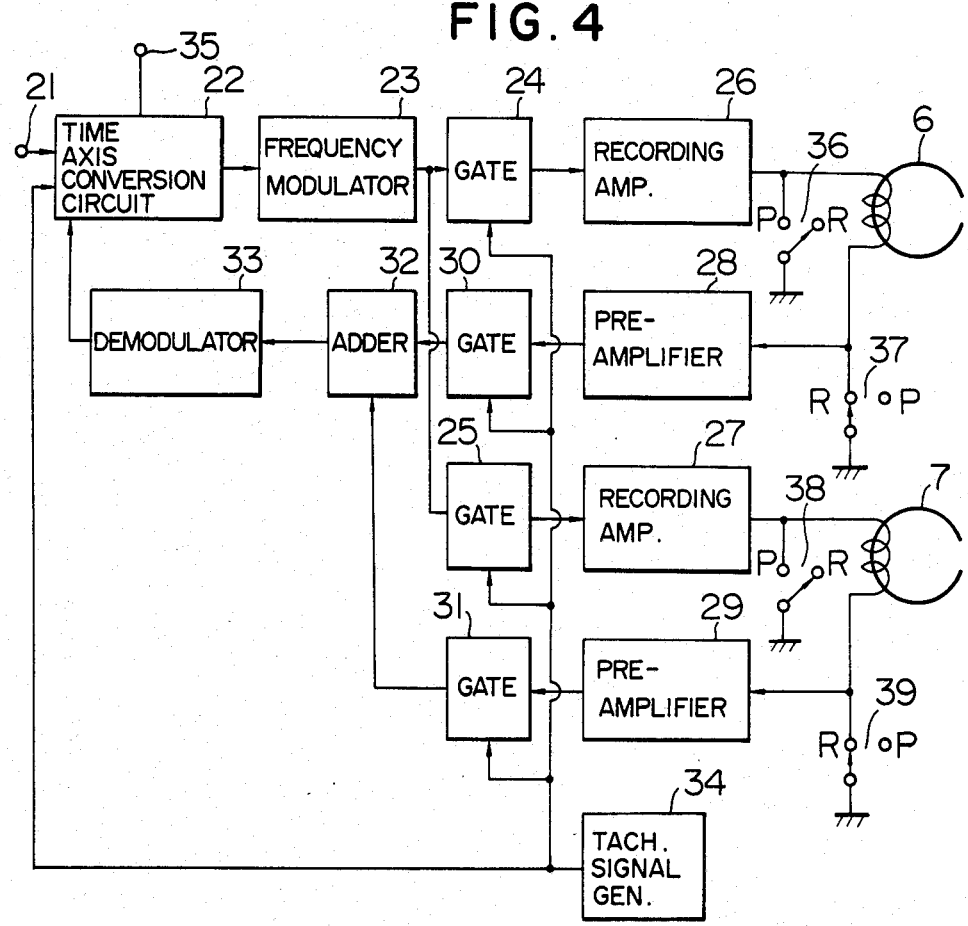
FIG. 4 shows in a block diagram a general arrangement of a recording/reproducing circuit according to an embodiment of the invention.

Referring to FIG. 4, there is shown in a block diagram a general arrangement of a recording/reproducing circuit of the magnetic video signal recording/reproducing apparatus according to an embodiment of the invention, which circuit is designed to control the recording and/or reproducing operation of the magnetic heads 6 and 7 in consideration of the facts mentioned above. In this connection, it should be noted that only a main portion of the recording/reproducing circuit is illustrated for clarifying the characteristic features of the invention. Referring to FIG. 4, a reference numeral 21 denotes an input terminal to which the video signal to be recorded is applied. A numeral 22 denotes a time axis conversion circuit for compressing the input video signal in respect to the time axis or base in the recording operation on the one hand and expanding the video signal in respect to the time axis in the reproducing operation on the other hand. The time axis conversion circuit 22 has an output terminal at which the time-axis compressed signal is produced and to which is connected a frequency modulator circuit 23 for modulating the time-axis compressed signal so as to be suitable for recording. The modulated signal output from the frequency modulator 23 is supplied to recording amplifier circuits 26 and 27 by way of gate circuits 24 and 25, respectively, which are controlled in synchronism with the rotational phases of the magnetic heads 6 and 7. Reference numerals 36, 37, 38 and 39 denote switches for changing over the recording mode and the reproducing (playback) mode. In the recording operation, these switches 36 to 39 are thrown to respective contacts labelled R, whereby the output signals of the recording amplifiers 26 and 27 are supplied to the magnetic heads 6 and 7, respectively. On the other hand, when the switches 36 to 39 are thrown to respective contacts P, the magnetic heads 6 and 7 are pre-amplified and connected to an adder circuit 32 by way of gate circuits 30 and 31, respectively. These gate circuits are opened or enabled in coincidence with periods during which the magnetic heads 6 and 7 trace the record tracks, respectively. The output signal of the adder circuit 32 is applied to the input of a demodulator circuit 33 for demodulating the frequency-modulated signal. The modulated signal undergoes time-axis expansion processing in the time axis conversion circuit 22 to be restored to the original signal which is then outputted from an output terminal 35. For controlling the timing of operations performed by the gate circuits 24, 25, 30 and 31 and the time axis conversion circuit 22, a tach. signal or tacho-signal is made use of which is produced by a tacho-signal (or tach. signal) generator circuit 34 on the basis of the rotation of the rotary head assembly 5.

Next, operation of the recording/reproducing circuit shown in FIG. 4 will be elucidated.

Referring to FIG. 4, the video signal in a standard system is supplied to the time axis conversion circuit 22 from the input terminal 21.

As described hereinbefore in conjunction with FIGS. 2a and 2b, the video signal of a standard system in which the period of one field is represented by $T_f$ must be recorded within a period of $(360° - \theta°) \cdot T_f/360°$ during which the magnetic heads 6 and 7 are, respectively, brought into contact with the magnetic tape 1 over the range extending from the point P to the point Q in each of the successive rotations of the magnetic head assembly 5. To this end, the video signal supplied to the time axis conversion circuit 22 is compressed in respect to the time axis or base at the ratio of $(360° - \theta°)/360°$.

The time axis conversion circuit 22 may be constituted, for example, by a storage such as a random access memory to which writing and reading operations can be conducted at arbitrary timing and speed, an analog-to-digital (A/D) converter circuit and a digital-to-analog (D/A) converter circuit. The video signal supplied to the time axis conversion circuit 22 is converted into a corresponding digital signal which is subsequently written in the storage or memory device, which is followed by the reading of the stored signal from the memory effected at a speed corresponding to the writing speed multiplied by $360°/(360° - \theta°)$, whereby the digital signal whose time axis or base is compressed by a factor of $(360° - \theta°)/360°$ can be obtained. Through the digital-to-analog conversion of the time-axis-compressed digital signal, the analog video signal whose time axis is correspondingly compressed can be obtained. Further, the time axis conversion circuit 22 is supplied with the tacho-signal which is generated by the tacho-signal generator 34 in synchronism with the rotational phases of the magnetic heads 6 and 7, whereby the time axis conversion circuit 22 is so controlled that the recording of the video signal may be carried out at the timing described hereinbefore by referring to FIGS. 2a and 2b, to thereby establish the timing at which the time-axis-compressed video signal is read out.

A typical example of the circuit configuration of the time axis conversion circuit 22 is shown in FIG. 6. The video signal supplied from the input terminal 21 and the video signal output from the demodulator circuit 33 in the reproducing operation can be selectively changed over by means of a switch circuit 221. This switching operation is controlled by a mode signal supplied to a mode signal input terminal 50 from an operation mode selector unit (not shown) and indicating the recording mode or alternatively the reproducing mode. The mode signal may consist of a signal which assumes a "H" level when the recording mode is selected while taking a "L" level in response to the selection of the reproducing or playback mode. The video signal output from the switch circuit 221 is applied to a horizontal synchronizing signal separator circuit 222 on the one hand and to an analog-to-digital (A/D) converter circuit 224 constituting a part of the storage or memory unit 220 on the other hand. In the horizontal synchronizing signal separator circuit 222, the horizontal synchronizing signal is separated. The output signal of the separator circuit 222 is supplied to a memory driver circuit 223 of the memory unit 220. The memory driver circuit 223 serves to prepare a reference clock signal which is in synchronism with the applied horizontal synchronizing signal. On the other hand, the video signal supplied to the analog-to-digital converter circuit 224 of the memory unit 220 is sampled by a sampling pulse signal which is synchronized with the reference clock signal produced by the memory driver circuit 223 to be thereby converted into a digital signal which is then written in a random access memory 225 constituting a main part of the memory unit 220. The signal written in the random access memory 225 is read out at the timing of a clock signal produced by the memory driver circuit 223 and supplied to a digital-to-analog (D/A) converter circuit 226 to be converted into an analog signal. As will be seen, the writing and reading operation of the random access memory 225 are controlled by the clock signal supplied from the memory driver circuit 223. Accordingly, by differentiating the writing speed and the reading speed from each other, i.e. by making the frequency of the clock signal for the writing operation differ from that of the clock signal for the reading operation, the time axis compression or alternatively the time axis expansion can be correspondingly realized. The timing for the writing operation and the reading operation to and from the memory unit 220 is controlled by the tacho-signal supplied from the tacho-signal generator circuit 34. The video signal output from the digital-to-analog converter circuit 226 is applied to a switch circuit 227 to be supplied to a frequency modulator circuit 23 for recording or alternatively to a reproduced signal output terminal 35 in dependence on whether the mode signal applied to the switch circuit 227 commands the recording operation or alternatively the reproducing operation.

In the case of the embodiment shown in FIGS. 4 and 6, the time axis conversion circuit is so designed as to serve for both the recording and reproducing operations with the same circuit configuration. It is however obvious that a time axis compression circuit only for the recording operation and a time axis expansion circuit only for the reproducing operation may be separately provided.

The video signal thus compressed in respect to the time axis and produced by the time axis conversion circuit 22 is supplied to the gate circuits 24 and 25 after having been frequency-modulated by the frequency modulator 23. The gate circuits 24 and 25 are operated in synchronism with the tacho-signal in such a manner that the gate circuit 24 is enabled or opened during the travel of the magnetic head 6 from the point P to the point Q (refer to FIG. 2a), while the gate circuit 25 is opened so long as the magnetic head 7 is moving from the point 7 to the point Q in the succeeding rotation of the head assembly. In other words, the gate circuits 24 and 25 are opened alternately with each other for every successive field of the time-axis-compressed video signal. As a result, the recording amplifiers 26 and 27 are supplied with the video signal alternately on the field-by-field basis, the amplified video signal outputs of these amplifiers being supplied to the relevant magnetic heads 6 and 7, respectively.

Next, description will be made of the reproducing operation.

In the reproducing or playback mode of operation, the change-over switches 36, 37, 38 and 39 are thrown to the respective contacts labelled P. The travel of the magnetic tape is controlled in a similar manner as is in the case of the conventional magnetic video recording-/reproducing apparatus so that the magnetic heads 6 and 7 may scan for reproduction the record tracks having the directions of magnetization coinciding with the azimuth angles thereof, respectively. As a result, the preamplifier circuits 28 and 29 are supplied with the time-axis-compressed video signal from the associated magnetic heads alternately for each of the successive fields. The amplified video signal outputs from the pre-amplifiers 28 and 29 are supplied to the gate circuits 30 and 31, respectively. The gate circuits 30 and 31 are operated in synchronism with the tacho-signal produced by the tacho-signal generator in such a manner that the gate circuit 30 is opened or enabled during the period in which the magnetic head 6 travels from the point P to the point Q (refer to FIG. 2a), to effect scanning for reproduction of the record track appropriate to the azimuth angle of the magnetic head 6, while the gate circuit 31 is opened in the succeeding rotation of the magnetic head assembly so long as the magnetic head 7 is travelling from the point P to the point Q for scanning the record track appropriate to the azimuth angle thereof for reproducing the recorded video information. In this way, only the video signal as desired is allowed to pass through the gate circuits 30 and 31, whose output video signals are added together by the adder circuit 32 to be subsequently demodulated by the frequency demodulator circuit 33. The demodulated video signal is then supplied to the time axis conversion circuit 22.

The time axis conversion circuit 22 is controlled by the tacho-signal produced by the tacho-signal generator 34 in the manner described hereinbefore. More specifically, the supplied video signal is written in the memory unit 220 of the time axis conversion circuit 22 at a writing speed equal to the reading speed in the recording operation and subsequently read out from the memory unit 220 at a reading speed equal to the writing speed multiplied by $(360° - \theta°)/360°$. Accordingly, there is provided at the output terminal a video signal expanded in respect to the time axis or base by a factor of $360°/(360° - \theta°)$, i.e. the video signal having the same time axis as that of the standard system.

The memory unit 220 of the time axis conversion circuit 22 destined for performing compression and expansion of the time axis of the video signal as described above should have a storage capacity corresponding to a product of the storage capacity required for storing at least one field of the video signal multiplied by $2\theta°/360°$.

Next, description will be made on the time axis compression of the video signal and the timing at which the video signal is supplied to the magnetic heads 6 and 7 on the assumption that the memory unit 220 as employed has the memory capacity mentioned above.

Referring to FIG. 2a, it is assumed that a point Q' lies at an angular distance $\theta°$ from the point Q on the side opposing the point P and that the rotational phase of the head assembly 5 is synchronized with the video signal of the standard system in such a manner that one field of the video signal of the standard system is started from a time point at which the magnetic head 6 is positioned at the point Q and thus the magnetic head 7 is positioned at the point Q'. From this time point, the writing operation of one field of the video signal in the memory unit 220 is initiated, while the read-out operation of that field of the video signal from the memory unit 220 is started at the moment when one of the magnetic heads 6 and 7 which is to effect the recording operation has attained the position P.

On these conditions, the time-axis compressing operation performed by the memory unit as well as the timing of the read-out operation will be described in more detail by also referring to FIGS. 5a and 5b wherein FIG. 5a shows a timing diagram for illustrating the video signal of a standard system supplied to the memory unit 220 from the input terminal 21 and FIG. 5b shows a timing diagram for illustrating the time-axis-compressed video signal obtained through the memory unit 220. In FIG. 5a, each of numerals 40 to 45 denotes one field of video signal of the standard system in concern, respectively, while 40a to 45a in FIG. 5b denote the corresponding fields of the time-axis-compressed video signal.

Assuming now that the field 40 of the video signal (hereinafter simply referred to as the field) is written in the memory unit 220 after the magnetic heads 6 and 7 have reached the points Q and Q', respectively, the field 40 is written at addresses in a sequential order.

In this connection, it is assumed that the memory unit is so arranged that when the video information is written at the last address thereof, the write-in operation is performed continuously and sequentially, starting again from the first address. On this assumption, the read-out operation is initiated at the reading speed mentioned hereinbefore, i.e. at the speed corresponding to the writing speed multiplied by $360°/(360° - \theta°)$ from the first address where the writing operation was made at first, at the moment the magnetic head 7 has reached the point P. In this way, the writing and reading operations are repeated in the memory unit in a manner in which the writing operation is followed up by the reading operation at higher speed. Accordingly, the field 40 inputted to the memory unit 220 is outputted therefrom as the field 40a which is compressed in the time axis by a factor of $(360° - \theta°)/360°$ and which is supplied to the magnetic head 7 in the manner described hereinbefore. When the magnetic head 7 has attained the point Q', the whole field 40 has been completely written in the memory unit 220 whereupon writing of the succeeding field 41 is initiated from the next address. At that time point, the magnetic head 6 is at the point Q. Further, at that time point, the last portion of the field 40 corresponding to the period of $T_f\theta°/(360° - \theta°)$ remains to be read. This portion of the field 40 is completely read out from the memory unit 220 during a period in which the magnetic head 7 is rotated from the point Q' to the point Q.

Upon reaching of the magnetic head 7 at the point Q, the reading of the whole field 40 has been completed. At that time point, the magnetic head 6 is located at the point P and a first portion of the field 41 corresponding to the period of $T_f\theta°/360°$ is stored in the memory unit 220 while the reading of the field 41 is initiated, starting from the address where it was written at first. The writing operation of the field 41 is performed continuously starting again from the first address upon reaching the last address. In this way, the writing and reading operation being followed up by the reading operation at a higher speed. As a result, the field 41 inputted to the memory unit 41 is outputted therefrom as the field 41a which is compressed in the time axis by a factor of $(360° - \theta°)/360°$ as compared with the input field 41. The time-axis-compressed field 41a (of video signal) is then supplied to the magnetic head 6 in the manner described hereinbefore.

When the magnetic head 6 has reached the point Q, the whole field 41 has been completely read out from the memory unit, and at the same time the writing of the succeeding field 42 is initiated, starting from the address following the one where the field 41 has been written. Upon reaching the magnetic head 7 at the point P, the reading of this field 42 is started, whereby the field 42a which corresponds to the field 42 compressed in the time axis is obtained to be supplied to the magnetic head 7.

As will now be understood, the timing for reading the video information from the memory unit 220 is determined in association with the positions of the magnetic heads 6 and 7. This timing for the reading operation is established on the basis of the tacho-signal generated by the tacho-signal generator 34, as described hereinbefore.

In this connection, it should be noted that although the video signal obtained from the memory unit 220 is continuous between the field 40a supplied to the magnetic head 7 and the field 41a supplied succeedingly to the magnetic head 6, there exists an interval ΔT between the field 41a and the field 42a which is succeedingly supplied to the magnetic head 7, as can be seen from FIG. 5b. This interval ΔT is required for the writing operation effected during the travel of the magnetic head 7 from the point Q' to the point P after the time-axis-compressed video signal to be supplied to the magnetic head 6 has been completely read out, as described hereinbefore, and defined as follows:

$$\Delta T = 2 \cdot T_f \theta°/360°$$

To say this in another way, this means that the memory unit performs completely the time axis compression of the video signal of the standard system at every second field, i.e. at every frame.

Next, the time-axis expanding operation of the memory unit 220 will be elucidated by also referring to FIGS. 5b and 5c.

Since the relative timing at which the fields of the video signal are reproduced by the magnetic heads 6 and 7, respectively, can be considered to be identical with the relative timing at which the fields of the video signal are supplied to the magnetic heads 6 and 7, respectively, a series of the fields illustrated in FIG. 5c may be duly regarded as representing the time-axis-compressed video signal reproduced by the magnetic heads 6 and 7 and supplied to the memory unit 220 of the time axis conversion circuit 22. On the other hand, FIG. 5c illustrates the time-axis-expanded video signals obtained through the memory unit 220. It will be noted that 40b to 45b represent the fields resulting from the time axis expansion of the fields 40a to 45a, respectively.

Assuming now that the magnetic head 7 is travelling from the point P to the point Q for reproducing the record track having the direction of magnetization matched with the azimuth angle thereof, the memory unit 220 performs the writing operation of the field 40a in the similar manner as the case of the recording operation, while executing simultaneously the reading operation at a reading speed corresponding to the writing speed multiplied by $(360° - \theta°)/360°$, starting from the first address where the video information was first written. Thus, the writing and reading operations are repeated in such a manner in which the writing operation is followed up by the reading operation which is performed at a lower speed than the former. When the magnetic head 7 has attained the point Q, the reproduction of the field 40a through the magnetic head 7 comes to an end. At that time point, however, the last portion of the field 40a which corresponds to the period of $T_f\theta(360° - \theta°)$ remains to be read out. This remaining portion of the field 40a is readout by the magnetic head 7 during the rotation thereof from the point Q to the point P. In this way, the field 40b resulting from the time axis expansion of the field 40a can be obtained from the memory unit 220.

On the other hand, at the aforementioned time point at which the magnetic head 7 has reached the point Q, the magnetic head 6 is at the point P. During the rotation of the magnetic head 6 from this point P to the point Q, the head 6 scans the record track having the direction of magnetization matched to the azimuth angle thereof, whereby the field 41a is reproduced. This field 41a is sequentially written in the memory unit 220 starting from the address located next to the last address where the video signal of the field 40a has been written. When the magnetic head 6 has attained the point P' distanced from the point P by the angle θ° in the rotating direction of the head, the read-out operation of the field 41a is started.

The writing and reading operations of the field 41a are repeatedly performed in the manner described hereinbefore, resulting in that upon reaching of the magnetic head 6 at the point Q, the writing operation of the field 41a is completed while the reading of the field 41a is continued until the magnetic head 6 has attained the point P'. In this way, the field 41b is produced from the memory unit 220 as the result of the time axis expansion of the field 41b.

When the magnetic head 6 has reached the point P', the magnetic head 7 is located at the point P from which the magnetic head 7 starts the reproduction of the field 42a, whereby the field 42b is produced through the time-axis-expanding operation performed by the memory unit 220. In the similar manner, the fields 42b, 43b, 44b, 45b and so forth are obtained through the time axis expansion.

It goes without saying that the video signal illustrated in FIG. 5c which has undergone the time axis expansion is the signal of the standard system in concern. There is illustrated in FIG. 5d an example of the tacho-signal produced by the tacho-signal generating circuit 34. As described hereinbefore, the tacho-signal is generated in synchronism with the rotation of the magnetic heads 6 and 7. For example, such tacho-signal may be produced in principle in the manner similar to the generation of the switching signal utilized for changing-over of the magnetic heads in the conventional two-head helical scan type of magnetic recording/reproducing apparatus. More specifically, means for detecting rotation of the magnetic heads 6 and 7 such as, for example, electromagnetic sensor element may be mounted on a member rotatable together with the magnetic heads at a predetermined position relative thereto, wherein the rotation detecting signal output of the sensor element is shaped into the tacho-signal.

In case the angular distance $\theta$ between the magnetic heads 6 and 7 shown in FIG. 2a is, for example, equal to 60°, no recording is made during one sixth of a rotation of the head assembly. Accordingly, the ratio of compression required for the recording of video signal of standard system in concern is 5/6, which in turn means that the frequency of video signal must be increased by a factor of 1.2. This value can be readily realized by improving the performance or properties of the magnetic heads, the magnetic tape and the like to some degree.

In this case, the memory unit 220 of the time axis conversion circuit 22 may be of the storage capacity which permits one third (or $2\theta°/360°$) of one field of the standard system to be stored. By way of example, assuming that the video signal is sampled at a sampling frequency to be converted into the 8-bit digital signal for being written in the memory unit 220, the latter may have the storage capacity of 56K bytes, because $$\frac{1}{60} \times \frac{1}{3} \times 10 \times 10^6 = 56 \times 10^3 \text{ (bytes)}$$

The memory unit of such storage capacity can be inexpensively realized in the present-day state of memory technology. In this connection, it should be mentioned that the reading speed is 1.2 times as high as the writing speed in the recording operation and vice versa in the reproducing operation.

It will be now understood that in the case of the embodiment described in the foregoing, the number of rotations of the head assembly is increased as compared with the conventional magnetic recording/reproducing apparatus of the two-head helical scan type, which means that the cylindrical magnetic head assembly can be realized in a reduced diameter in view of the relative speed between the magnetic heads and the magnetic tape. By virtue of this feature, the magnetic recording-/reproducing apparatus according to the illustrated embodiment can be manufactured in a small size and a light weight while assuring a satisfactory image quality of the reproduced picture. Further, since the azimuth recording system can be adopted, the recording density can be increased and the reproduction of the recorded video signal can be accomplished without any loss or drop-out of video information.

In case the audio or sound signal is recorded on the magnetic tape in the longitudinal direction thereof, there arises deviation $\Delta T$ in time between the reproduced audio and video signals, as can be seen from FIGS. 5a to 5c. Such deviation is however negligibly small, giving rise to no practical problem. By the way, in case the aforementioned ratio $\alpha$ of compression is 5/6, the deviation $\Delta T$ is on the order of 3 m sec and involves no practical problem in consideration of the fact that deviation of one field is usually permissible.

In the embodiment described above, the video signal of the standard system may be either for the broadcasting or from a video camera. In this connection, it should be pointed out that in the case of a magnetic recording-/reproducing apparatus which incorporates a video camera, the time axis compression of the video signal can be omitted in the recording operation provided that the video camera is so designed as to perform a special scanning upon recording the video signal supplied from the video camera, as will be mentioned below.

A magnetic recording/reproducing apparatus embodied according to the invention with the above consideration taken into account will now be described.

The video camera may be regarded as a sort of the storage or memory unit. By taking advantage of this fact, the scanning operation for reading out the video signal from the imaging device is synchronized with the rotation of the magnetic heads 6 and 7 (FIG. 2a). In that case, the scanning speed is so selected that the period required for scanning one frame is equal to the period required for two rotations of the magnetic head (6, 7) and multiplied by a factor of $(360° - \theta°)/360°$, while the scanning is interrupted for a period $\Delta T = 2 \cdot T_f \theta°/(360° - \theta°)$ in every frame. Through the scanning operation effected in this manner, the video signal whose time axis is compressed as shown in FIG. 5b can be obtained from the video camera. The video signal may be directly supplied to the frequency modulator 23 shown in FIG. 4. In the reproducing operation, the video signal of the standard system can be obtained at the output terminal after having been processed by the reproducing circuitry shown in FIG. 4.

The aforementioned scanning operation of the video camera can be readily realized through simple modification of the deflecting system in the case of a conventional type vidicon. When a solid-state imaging device is employed, the process of scanning the pixels has to be slightly modified. So long as the scan interrupt period $\Delta T$ is short, unnaturalness will not be observed in the reproduced picture to any appreciable degree.

By the way, the record tracks (FIG. 3) formed on the magnetic tape in the magnetic recording/reproducing apparatus according to the embodiments of the invention described in the foregoing can be produced in the pattern utterly identical with that of the record tracks formed by the hitherto known two-head helical scan type magnetic recording/reproducing apparatus for domestic use in which the azimuth recording is adopted. Accordingly, the record tracks produced by the inventive apparatus can be reproduced by using the conventional magnetic recording/reproducing apparatus for home use. To this end, the diameter $\phi'$ and the lead angle $\theta'_0$ of the head cylinder of the conventional recording/reproducing apparatus for home use should be so selected as to satisfy the following conditions:

$$\pi \phi a \cos\theta_0 - \frac{\pi \phi'}{2} \cos\theta'_0 = \pm \frac{V_t}{f_V} (1 - a) \quad (1)$$

and $$\pi \phi a \sin\theta_0 = \frac{\pi}{2} \phi' \sin\theta'_0 \quad (2)$$

where $\phi$ and $\theta_0$ represent, respectively, the diameter and the lead angle of the head assembly drum of the magnetic recording/reproducing apparatus according to the invention. In the expression (1), the righthand member assumes the minus sign when the scanning direction of the magnetic head is the same as the travelling direction of the magnetic tape, while taking the plus sign when both the directions are opposite to each other.

In both of the above expressions (1) and (2),
  $V_t$ represents travelling speed of the magnetic tape,
  $f_V$ represents the field frequency, and
  $a$ represents the ratio of compression.

By way of example, in the case of a so-called VHS-system video tape recorder of two-hour mode,
$\phi' = 62$ mm,
$\theta'_0 = 5°56'7.4''$,
$V_t = 33.35$ mm/sec, and
$f_V = 59.94$ (NTSC system)
Accordingly, when $\alpha = 5/6$,
$\phi = 37.167$ mm, and
$\theta_0 = 5°58'22''$.

Obviously, the diameter of the cylindrical head assembly of the magnetic recording/reproducing apparatus according to the invention can be reduced to about 60% of that of the magnetic head cylinder of the video tape recorder of VHS system and thus implemented in a miniature size, and the magnetic tape carrying the record tracks on which the video signal produced by the video camera incorporated integrally in the magnetic recording/reproducing apparatus according to the present invention can be replayed by the conventional video tape recorder of VHS system.

It has been an important problem to realize the magnetic recording/reproducing apparatus incorporating integrally a video camera in a small size and light weight unit to enhance the portability for the convenience of use. This problem is solved satisfactorily by the present invention.

FIGS. 7a, 7b and 7c show timing diagrams for illustrating another embodiment of the magnetic recording/reproducing apparatus according to the present invention. In the FIGS., 41c, 42c and 43c denote overlap record signals (i.e. the signals recorded in overlap), Tr represents a period of one frame. $T_o$ represents an overlap recording period, and $\Delta T'$ represents the drop-out period. Parts corresponding to those shown in FIGS. 5a to 5c are denoted by like reference symbols.

Usually, in the magnetic recording/reproducing apparatus of two-head helical scan type, a part of the same video signal is recorded in overlap between the adjacent track with a view to preventing influence of variation in the switching position of the magnetic head from appearing on the reproduced picture. However, in the magnetic recording/reproducing apparatus described hereinbefore in conjunction with FIGS. 5a to 5d, the overlap recording is not performed because the drop-out period $\Delta T$ is inserted in succession to the completed recording by the magnetic head 6 (FIG. 2a).

According to the instant embodiment of the invention, it is intended to perform the overlap recording within a period corresponding to $\Delta T$ shown in FIG. 5b. To this end, an overlap period $T_o$ is set in every frame as is shown in FIG. 7a to thereby allow the same video signal to be recorded on the two adjacent tracks, respectively, within the period $T_o$.

The magnetic recording/reproducing apparatus according to the instant embodiment of the invention can be realized in principle in the same circuit configuration as those shown in FIGS. 4 and 6. A difference from the latter is seen in the storage capacity of the memory unit 220 constituting a main part of the time axis conversion circuit 22. More particularly, according to the instant embodiment illustrated in FIGS. 7a to 7c, the random access memory 225 shown in FIG. 6 must have a storage capacity greater than the value described in conjunction with FIG. 5 by a factor of $(Tr + T_o)/Tr$. Further, the timing at which the individual fields are written in and read out from the memory unit 220 is slightly modified as mentioned below.

FIG. 8 is a schematic plan view of the cylindrical magnetic head assembly for illustrating the timing for operation of the memory unit 220. In the figure, parts corresponding to those shown in FIG. 2a are denoted by the same reference sumbols.

Referring to FIG. 8, it is assumed that a point $P_2$ is located on the head cylinder 5 at an angular distance $\delta$ from the point P in the direction opposite to the rotating direction B of the head cylinder 5, and that point $Q_2$ and $Q_3$ are located at angular distances $\delta'$ and $\delta$ from the point Q in the directions opposite to and same as the rotating direction B of the head cylinder 5, respectively. One field of the video signal is read out from the memory unit to be recorded by the magnetic head 6 or 7 in the course of rotation of the head cylinder or assembly 5 from the point P to the point Q, as is in the case of the embodiments described hereinbefore. However, it is assumed that the writing of each field to the memory unit is started at the time point at which the magnetic head 6 is present at the point $Q_2$. The wrap angle of $(360° - \theta°)$ at which the magnetic tape is wound around the head cylidner 5 is so set that the magnetic tape (not shown) is scanned by the magnetic heads 6 and 7 in the course of rotation thereof at least from the point $P_2$ to the point $Q_3$. (refer to FIGS. 2a and 8).

Also referring to FIGS. 7a and 7b, the field 40 (of video signal) is written in the memory unit by the magnetic head 6 starting from the point $Q_2$, and the reading of the field 40 from the memory unit is started at a higher speed when the magnetic head 7 has reached the point P, whereby the field 40a having the time axis or base compressed is recorded by the magnetic head 7. Upon reaching of the magnetic head 6 at the point $Q_2$, the writing operation of the succeeding field is started. However, the reading of the field 40 continues until the magnetic head 7 has attained the point Q.

Upon arrival of the magnetic head 7 at the point Q, the magnetic head 6 reaches the point P, whereupon the reading of the field 41 from the memory unit is started, resulting in that the time-axis-compressed field 41a is supplied to the magnetic head 6. At the time point when the magnetic head reaches the point $Q_2$, the writing of the succeeding field 42 to the memory unit is initiated.

When the magnetic head 6 reaches the point Q, the reading of the whole field 41 is completed. However, in the course of further rotation of the magnetic head 6 from the point Q to the point $Q_3$, the field 42 written in the memory unit is read out. Thus, the magnetic head 6 is supplied with the time-axis-compressed field 41a together with a signal part 42c (overlap record signal) of the time-axis-compressed field 41a to be recorded on the same track in overlapping relation.

Next, upon arrival of the magnetic head 7 at the point $P_2$, the reading operation from the memory unit is started from the address at which the preceding field 41 was written rather than the first of the addresses at which the field 42 was written by skipping a number of the addresses from which the reading of video signal is performed in the course of rotation of the magnetic head 7 from the point $P_2$ to the point P. When the magnetic head has reached the point P, the reading of the field 42 is then started.

In this way, the reading operation from the memory unit is started from the preceding predetermined address, wherein the reading of the field 42 is effected during a period required for the magnetic head 7 to attain the the point Q. In the course of rotation of the magnetic head 7 from the point $P_2$ to the point Q, the overlap record signal 41 which constitutes a part of the preceding time-axis-compressed field 41 and the field 42a are read out and supplied to the magnetic head 7 to be recorded on the same recording track.

The writing and reading of further fields to and from the memory unit are effected in the similar manner, whereby the record tracks containing the overlap portions, respectively, are formed on the magnetic tape by means of the magnetic heads 6 and 7.

In reproducing operation, the field 41a and the overlap record signal, for example, are written in the memory unit during the scanning period of the magnetic head 6 corresponding to the rotation thereof from the point P to the point $Q_3$, which is followed by the writing of the overlap record signal 41c and the field 42a during the scanning period of the magnetic head 7 from the point $P_2$ to the point Q. The reading operation is performed by jumping from the address at which the field 41a was written to the one succeeding to the address where the overlap record signal carrying information corresponding to that of the field 41a was written or alternatively by jumping from the address where the overlap record signal 42c was written to the one succeeding to the address where the field 42a of the video information corresponding to that of the overlap record signal 42 was written, whereby the continuous original video signal of the standard system in concern can be obtained, as is illustrated in FIG. 7c.

In this conjunction, it should be mentioned that the reproduction can also be accomplished by using a hitherto known magnetic recording/reproducing apparatus of the two-head helical scan type. In any case, influence of variations in the change-over or switching position of the magnetic head can be positively prevented from making appearance on the reproduced picture by virtue of the presence of the portion recorded in overlap as described above.

Since the period $T_o$ for the overlapped recording is sufficiently short as compared with the one-frame period $T_f$, it is sufficient to increase only a little the storage capacity of the memory unit for carrying out the overlapped recording.

FIGS. 9a, 9b and 9c are timing diagrams for illustrating a further embodiment of the magnetic recording/reproducing apparatus according to the present invention, wherein parts corresponding to those shown is FIGS. 5a to 5c are denoted by same reference symbols.

In the case of the embodiments described in conjunction with FIGS. 5 and 7, the magnetic heads 6 and 7 are disposed with an angular distance therebetween which corresponds to the angular distance $\theta°$ between the points Q and P. In the instant embodiment mentioned below, it is intended to dispose the magnetic heads 6 and 7 with a smaller angular distance $\beta°$ than the angle $\theta°$. Except for this difference, other arrangement is same as in the case of the embodiment described before in conjunction with FIGS. 5a to 5d.

More specifically, referring to FIGS. 9a to 9c in combination with FIG. 2a in which the magnetic heads 6 and 7 should however be assumed to be disposed at a smaller angular distance $\beta°$ rather than $\theta°$, the field 40 begins to be written in the memory unit 220 of the time axis conversion circuit 22 from the time point when the magnetic head 6 is located at the point Q, while the reading of the field 40 is started when the magnetic head 7 has reached the point P. At this time point, a part of the field 40 which corresponds to the period of $T_f(\theta° + \beta°)/360°$ has been stored in the memory unit.

When the magnetic head 6 reaches the point Q, the writing of the succeeding field 41 to the memory unit is started, while the reading of the field 40 comes to an end upon arrival of the magnetic head 7 at the point Q. During rotation of the magnetic head 7 from the point P to the point Q, the time-axis-compressed field 40a is obtained from the memory unit to be recorded through the magnetic head 7.

Next, at the moment the magnetic head 6 has attained the point P, the reading of the field 41 from the memory unit is started. At that time point, the field 41 of a period corresponding to $T_f\theta°/360°$ has been stored. The time interval $\Delta T''$ interposed between end of reading the preceding field 40 and the start of reading the succeeding field 41 is given by $T_f(\theta° - \beta°)/360°$.

When the magnetic head 6 has reached the point Q, the writing and reading operations to and from the memory unit are completed substantially simultaneously, whereupon the writing of the next succeeding field 41 is started. In the course of rotation of the magnetic head 6 from the point P to the point Q, the time-axis-compressed field 41a is outputted from the memory unit to be recorded on the magnetic tape through the magnetic head 6.

Upon reaching of the magnetic head 7 at the point P, the reading of the field 42 from the memory unit is started. The further succeeding fields are sequentially written in and read out from the memory unit in the similar manner to be alternately recorded by the magnetic heads 6 and 7.

Also in this case, the time interval $\Delta T'$ intervaning between the completed reading of the preceding field 41 from the memory unit and the start of reading the succeeding field 42 is given by $T_f(\theta° + \beta°)/360°$.

In this way, there can be derived through the memory unit the time-axis-compressed vided signal in which the drop-out internvals $\Delta T'$ and $\Delta T''$ are alternately present at every field. It should be noted that the sum of $\Delta T'$ and $\Delta T''$ is equal $\Delta T$ shown in FIG. 5b. In this case, $\Delta T'$ is shorter than $\Delta T''$. Difference between the intervals $\Delta T'$ and $\Delta T''$ becomes smaller, as the magnetic heads 6 and 7 are disposed closer to each other. It is sufficient for the memory unit to have the storage capacity capable of storing the video signal of the standard system in concern corresponding to $T_f(\theta° + \beta°)/360°$ $(=\Delta T')$.

In the playback operation, the time-axis-compressed fields are reproduced by the magnetic heads 6 and 7 alternatively during the respective rotations thereof from the point P to the point Q, wherein the video signal (FIG. 9c) of the standard system in concern can be obtained through the time-axis-expansion effected by reading one field of the once stored and reproduced video signal from the memory unit in each rotation of the head cylinder or assembly in the similar manner as is in the case of the embodiment described hereinbefore in conjunction with FIG. 5 except that the angular distance between the points P and P' (FIG. 2a) is selected equal to $\beta$.

The magnetic recording/reproducing apparatus illustrated in FIGS. 7 and 8 may be combined integrally with the video camera designed for performing the special scanning as described in conjunction with FIG. 6 to thereby accomplish the similar operation. Further, the record tracks as formed can also be reproduced by the hitherto known two-head helical scan type magnetic recording/reproducing apparatus.

Next, description will be made of the magnetic recording/reproducing apparatus according to another embodiment of the invention in which the magnetic heads 6 and 7 are disposed closer to each other. In the preceding embodiments of the invention, the video signal of a unit period, e.g. one field is recorded and reproduced by the two magnetic head alternately. The embodiment of the invention described below is so designed that the video signal is recorded and reproduced by a pair of magnetic heads simultaneously. In this case, one of the magnetic head is used for recording and reproducing the luminance signal, while the other is used for recording and reproducing the chrominance signal. The two magnetic heads are so disposed that the azimuth angles of the respective gaps are different from each other as in the case of the preceding embodiments.

Now, description will be made on a concrete arrangement of the embodiment.

Figure 10A:
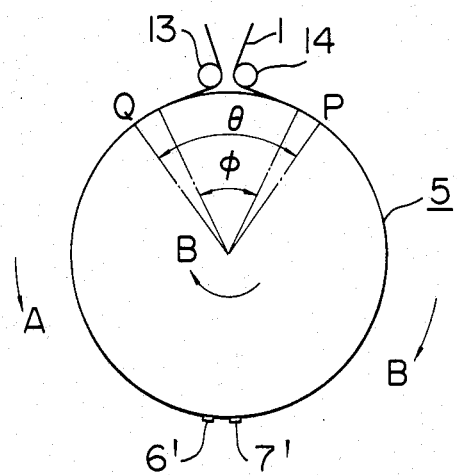
FIGS. 10a and 10b are views showing in detail a structure of rotary magnetic head assembly for use in the magnetic recording/reproducing apparatus according to another embodiment of the invention.
Figure 10B:
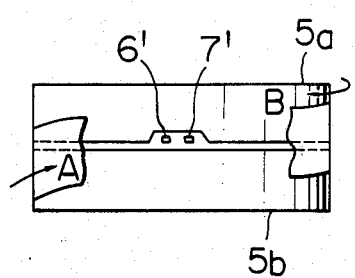

FIGS. 10a and 10b show a rotary head assembly 5 suited for use in the magnetic recording/reproducing apparatus according to the instant embodiment in a plan view and an elevational view, respectively. The magnetic tape 1 is wound around the rotary head assembly 5 at the wrap angle of $(360° - \phi°)$ as in the case of the preceding embodiments. The magnetic heads denoted by 6' and 7' and having respective gaps of azimuth angles differing from each other are disposed closer to each other with an offset or difference in height in the direction of the axis of rotation which substantially corresponds to the pitch of the record tracks (although not show in FIG. 10b). A rotatable cylinder 5a having the magnetic heads 6' and 7' mounted thereon is rotated at a period corresponding to one field of the color video signal in synchronism with the vertical synchronizing signal of the color television signal of a standard system in concern. For example, in the case of the NTSC system, the head cylinder 5a is rotated at a speed of 3600 rpm. In each rotation of the head cylinder 5a, the magnetic head 6' records or reproduces the luminance signal during rotation from the point P to the point Q over an angular range of $(360° - \theta°)$ (where $\theta° > \phi°$) within the region in which the magnetic tape is wound around the head cylinder 5, while the magnetic head 7' simultaneously records or reproduces the chrominance signal during rotation thereof over the angular range of $(360° - \theta°)$. More specifically, when the period of one field of the color television signal according to the standard system such as NTSC, PAL, SECAM or the like system is represented, by $T_f$, each of the magnetic head 6' and 7' performs a single complete rotation during the period $T_f$, whereby the luminance signal and the chrominance signal of one field of the period $T_f$ are recorded or reproduced in each rotation of the head cylinder during a period defined below:

$$T_f(360° - \theta°) \qquad (3)$$

while neither recording nor reproduction takes place in the remaining period given by $T_f\theta°/360°$.

Figure 11:
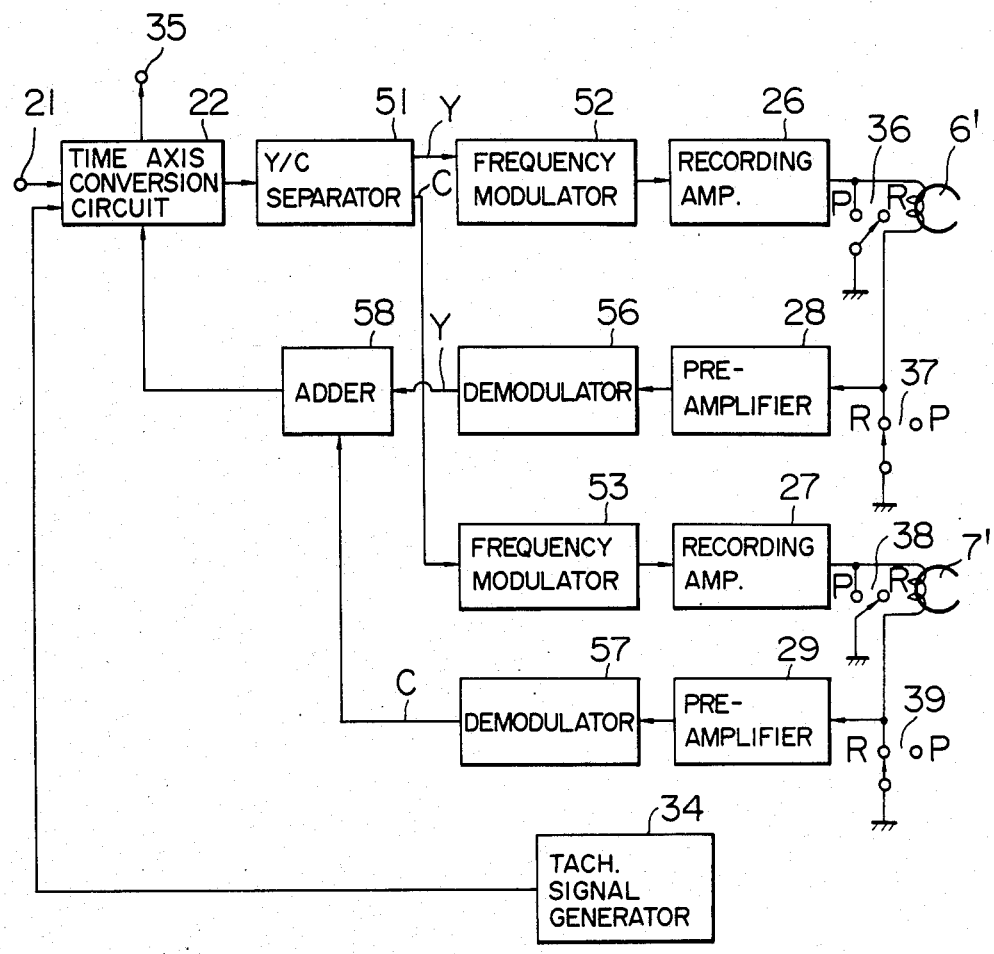
FIG. 11 is a block diagram showing a general arrangement of a magnetic recording/reproducing apparatus according to still another embodiment of the invention.

FIG. 11 shows in a block diagram an exemplary embodiment of the recording/reproducing circuit for recording and/or reproducing the luminance signal in the manner described above. In FIG. 11, the components having functions equivalent to those shown in FIG. 4 are denoted by like reference symbols. In the instant embodiment, the time axis conversion circuit 22 can be implemented in the configuration similar to that of the preceding embodiment shown in FIG. 6. A reference numeral 51 denotes a separator circuit for separating the time-axis-compressed video signal into the luminance signal Y and the chrominance signal C. Numerals 52 and 53 denote frequency modulating circuits for modulating in frequency the luminance signal and the chrominance signal, respectively, so that they are suited for the recording. Numerals 56 and 57 denote demodulator circuits for demodulating the frequency-modulated luminance signal and the frequency-modulated chrominance signals, respectively, which are reproduced from the magnetic tape 1 by means of the magnetic heads 6' and 7', respectively, in the playback or replay operation. The demodulated signals outputted by the demodulators 56 and 57 are supplied to a synthesizing or addition circuit 58 to be added together for re-constituting the composite color video signal whose time axis is in the compressed state.

Next, operation of the recording/reproducing circuit will be described.

Referring to FIG. 11, the color video signal of a standard system is supplied to the time-axis-compression circuit 22 through an input terminal 21.

As described hereinbefore, the luminance signal and the chrominance signal having a period $T_f$ corresponding to one field of the standard system in concern have to be recorded within a period in which the magnetic heads 6' and 7' are in contact with the magnetic tape in each rotation of the head cylinder, i.e. within a region extending from the point P to the point Q and expressed by $(360° - \theta°) \cdot T_f/360°$. To this end, the color video signal supplied to the time axis conversion circuit 22 is compressed in the time axis or base at the ratio of $(360° - \theta°)/360°$.

The time axis conversion circuit 22 may be realized in the same configuration as the one shown in FIG. 6, as described hereinbefore. Accordingly, by reading the video signal written in the memory unit 220 at a reading speed corresponding to a product of the writing speed multiplied by $360°/(360° - \theta°)$, the video signal whose time axis is compressed by a factor of $(360° - \theta°)/360°$ can be obtained. The tacho-signal produced by the tacho-signal generator 34 is supplied to the time axis conversion circuit 22 in synchronism with the rotational phoses of the magnetic heads 6' and 7', whereby the timing at which the time-axis-compressed color video signal is read from the memory unit 220 of the time axis conversion circuit is so controlled that luminance signal and the chrominance signal may be recorded in a manner described above.

The memory unit 220 of the time axis conversion circuit 22 may be of a storage capacity equal to at least the storage capacity capable of storing one field of the color video signal and multiplied by a value of $\theta°/360°$.

With such memory unit, the color video signal is sequentially stored in the random access memory 225 of the memory unit 220 starting from the first address thereof when the magnetic head 6' is in the course of rotation from the point Q to the point P shown in FIG. 10. Upon arrival of the magnetic head 6' at the point P, the video color signal has been stored to the last address. Simultaneously, the sequential reading of the color video signal from the random access memory 225 is initiated starting from the first address thereof at the reading speed corresponding to the product of the writing speed multiplied by $360°/(360° - \theta°)$, while the color video signal succeeding to the one stored preceedingly is sequentially stored in the random access memory 22 starting from the first address from which the preceding color video signal information has been read out. In this manner, the writing and reading operations are repeated over the first to last addresses of the memory unit 220 in the manner in which the reading operation is followed up by the writing operation at a lower speed than the former. When the magnetic head 6' has reached the point Q, the reading operation is once stopped, and the similar operations are repeated. In this connection, it should be noted that when the magnetic head 6' has reached the point Q, the address at which the color video signal information is written will substantially coincide with the address from which the video signal information is to be read. Accordingly, the succeeding writing operation initiated when the magnetic head 7' is at the point Q is made starting from the first address of the memory unit, whereby the similar operation is repeated.

Figure 12:
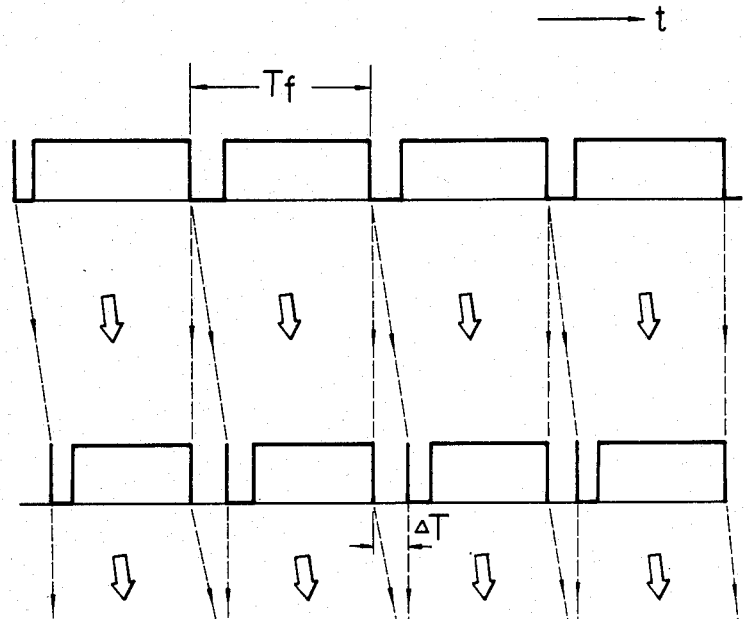
FIGS. 12a to 12c show timing charts for illustrating operation of the apparatus shown in FIG. 11.

FIGS. 12a, 12b and 12c show timing diagram for illustrating operation of the time axis conversion circuit 22 shown in FIG. 11, wherein FIG. 12a shows the color video signal supplied to the time axis conversion circuit 22 and FIG. 12b shows the color video signal resulted from the time axis compression performed by the time axis conversion circuit 22. A symbol $T_f$ represents the period of one field, and $\Delta T$ represents a time required for the magnetic head 6' shown in FIG. 10a to move from the point Q to the point P.

As will be seen in FIGS. 12a and 12b, the time-axis-compressed color video signal output from the time axis conversion circuit 22 has a period of $(T_f - \Delta T)$ in one field and is delayed by $\Delta T$ relative to the color video signal inputted to the time axis conversion circuit 22. In the case of the embodiment shown in FIG. 10a, $\Delta T$ is equal to $T_f \theta°/360°$.

FIG. 12c will be referred to later on.

Turning back to FIG. 11, the time-axis-compressed color video signal output from the time axis conversion circuit 22 is supplied to the Y/C separator circuit 51 to be separated into the luminance signal Y and the chrominance signal C. The luminance signal Y is supplied to the frequency modulating circuit 52 to be outputted therefrom as the frequency-modulated luminance signal (hereinafter referred to as the FM luminance signal) which is subsequently supplied to the magnetic head 6' after having been amplified by a recording amplifier 26. On the other hand, the chrominance signal C separated through the separator circuit 51 is supplied to the frequency modulating circuit 53 to be outputted therefrom as the frequency-modulated chrominance signal (hereinafter referred to as the FM chrominance signal) which is then supplied to the magnetic head 7' after having been amplified by a recording amplifier 27. All of the change-over switches 36, 37, 38 and 39 are thrown to the respective contacts R so that the magnetic heads 6' and 7' can record the FM luminance signal and the FM chrominance signal during rotation thereof from the point P to the point Q.

Figure 13:
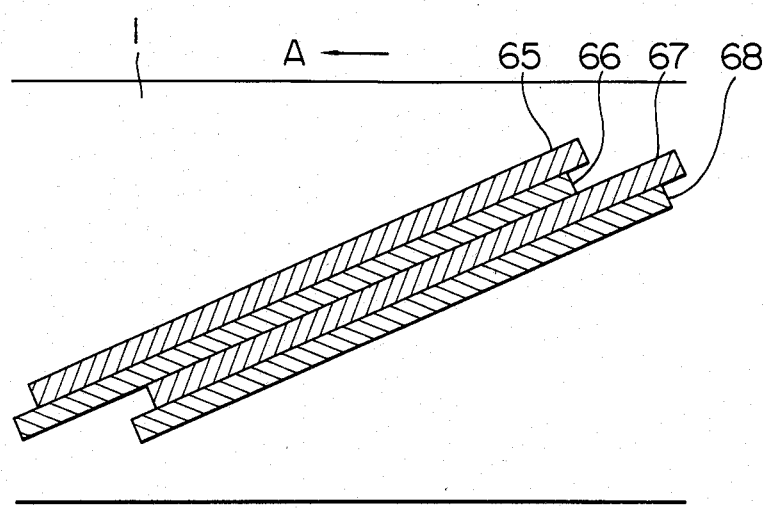
FIG. 13 is a view showing a pattern of record tracks formed on a magnetic tape by the apparatus shown in FIG. 11.

FIG. 13 shows a pattern of record tracks formed by the magnetic heads 6' and 7' through the procedure described above. The record tracks 65 and 67 are formed by the magnetic head 6', recording thereon the FM luminance signal, while the record tracks 66 and 68 are formed by the magnetic head 7' and record thereon the FM chrominance signal. It will be seen that the record tracks containing the FM luminance signal and those recording the FM chrominance signal are formed alternately in the longitudinal direction of the magnetic tape 1. The record tracks located adjacent to each other have directions of magnetization which differ from one another in accordance with the azimuth angles of the head gaps of the magnetic heads 6' and 7', respectively.

Referring again to FIG. 11, description will be made of the reproducing operation of the recording/reproducing apparatus according to the instant embodiment of the invention.

In this case, the change-over switches 36, 37, 38 and 39 are thrown to the respective contacts P, whereby the magnetic heads 6' and 7' are allowed to scan for reproduction the record tracks on the magnetic tape during rotation from the point P to the point Q (FIG. 10a). Referring to FIG. 13, the magnetic head 6' scans the record track 65 for reproduction of the color video signal while the magnetic head 7' scans the record track 66 simultaneously with the magnetic head 6', which is followed by the simultaneous scanning for reproduction of the record tracks 67 and 68 performed by the magnetic heads 6' and 7', respectively. In this way, the magnetic head 6' scans sequentially the record tracks on which the FM luminance signal is recorded, while the magnetic head 7' scans sequentially the record tracks on which the FM chrominance signal is recorded.

The FM luminance signal reproduced through the magnetic head 6' is demodulated by the frequency demodulating circuit 56 after having been amplified by a preamplifier 28. On the other hand, the FM chrominance signal picked up by the magnetic head 7' is demodulated by a frequency demodulating circuit 57 after having been amplified by a pre-amplifier 29. The demodulated luminance signal Y and the demodulated chrominance signal C are mixed together through the synthesizing circuit 58, the output signal of which undergoes the time axis expansion through the time axis conversion circuit 22 to be reproduced as the color video signal of the standard system in concern and supplied to the output terminal 35.

In the time axis conversion circuit, the same memory as employed for performing the time axis compression in the recording operation can be used for the reproduction, as is in the case of the preceding embodiments. The writing speed in the reproducing operation is set equal to the reading speed in the recording operation, while the reading speed in the reproducing operation is set equal to the writing speed in the recording operation. Accordingly, in the reproducing operation, the reading speed corresponds to the writing speed multiplied by $(360° - \theta°)/360°$, resulting in that the color video signal outputted from the synthesizing circuit 58 is expanded in the time axis by a factor of $360°/(360° - \theta°)$, whereby the standard color video signal is obtained at the output terminal 35.

In the memory unit 220 of the time axis conversion circuit 22, the writing operation is effected at the first address whenever the magnetic head 6' reaches the point P (FIG. 10a) which corresponds to the beginning of the recording track. Substantially at the same time, the first address is read out (i.e. immediately succeeding the writing operation at the first address). The reading and writing operations are repeated in the manner in which the writing operation is followd up by the reading operation at a lower speed than the former. At the time point when the magnetic head 6' has attained the point Q, the magnetic heads 6' and 7' are located at the end positions of the respective record tracks, whereupon the writing operation to the memory unit 220 is stopped. At that time, the address at which the color video information is to be written will substantially coincide with the reading address from which the video information is to be read out. The reading operation of the whole memory unit 220 is subsequently effected only once more. This reading operation takes place during the period in which the magnetic head 6' moves from the point Q to the point P i.e. in the region of $T_f \theta°/360°$, resulting in that a quantity of the color video signal information corresponding to the storage capacity of the memory unit 220 is read out.

At the moment the magnetic head 6' has attained the point P, reproduction of the luminance signal and the chrominance signal by the magnetic heads 6' and 7' is started. Thus, the writing and reading operations are initiated again starting from the first address of the memory unit 220 of the time axis conversion circuit 22 in the similar manner. In this way, the time axis expansion of the reproduced color video signal is accomplished.

FIGS. 12b and 12c illustrate timing relation between the input color video signal and the output color video signal of the time axis conversion circuit 22. The beginning of the color video output signal (FIG. 12c) undergone the time axis expansion approximately coincides with the beginning of the time-axis-compressed color video signal (FIG. 12b) inputted to the time axis conversion circuit 22. However, the output color video signal is expanded in the time axis by $\Delta T$ ($=T_f \theta°/360°$) relative to the input color video signal. Accordingly, one field of the output color video signal has the period $T_f$.

When the timings of the time-axis-compressed color video signal and the time-axis-expanded color video signal produced through the time-axis compressing operation and the time-axis expanding operation of the time axis conversion circuit 22 are considered with reference to the timing of the color video signal of the standard system in concern, the timing relation is such as illustrated in FIGS. 12a, 12b and 12c. More specifically, there arises a difference in time represented by $\Delta T$ between the color video signal of the standard system to be recorded (FIG. 12a) and the reproduced color video signal of the standard system. As a consequence, there is produced the time difference or deviation between the reproduced color video signal of the standard system and the reproduced audio or sound signal. However, since the difference $\Delta T$ is of a sufficiently small value, no problem of deviation does occur in practice between the reproduced picture and sound.

Figure 14:
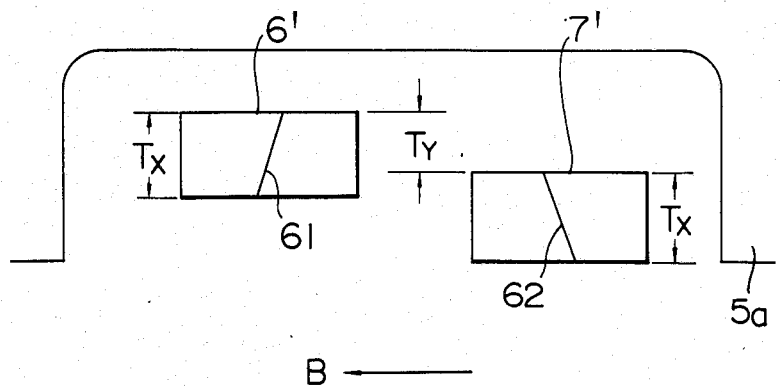
FIG. 14 is a view showing in detail an exemplary disposition of two magnetic heads.

Referring to FIG. 14 which is a view for illustrating in detail an example of positional relationship between the magnetic heads 6' and 7' shown in FIG. 10b, reference symbols b1 and b2 designate the gaps of the magnetic heads, respectively. In FIG. 14, parts corresponding to those shown in FIG. 10b are denoted by like reference symbols.

The magnetic heads 6' and 7' having the respective gaps 61 and 62 of azimuth angles differing from each other have a gap width (track width) $T_X$ and are disposed closely to each other with an offset $T_Y$ (where $T_Y > T_X$) in the direction perpendicular to the rotating direction B of the upper cylinder 5a. Information of the record tracks on the magnetic tape through the contact scanning effected by the magnetic heads 6' and 7', the record track associated with the magnetic head 6' is first formed, which is followed by formation of the record track by the magnetic head 7' in partial overlap or superposition on the first formed track with an overlap width of $(T_X - T_Y)$ Accordingly, the record track formed by the magnetic head 6' has a width $T_Y$ and the record track formed by the magnetic head 7' has a width $T_X$.

In the succeeding formation of the second record tracks by the magnetic heads 6' and 7' during a next rotation thereof, the record track associated with the magnetic head 6' is formed in partial overlap of width $(T_X - T_Y)$ on the record track formed by the magnetic head 7' in the preceding rotation thereof. This type of recording can be realized by appropriately selecting the speed of the magnetic tape. Consequently, the record track formed by the magnetic head 7' also has the width $T_Y$.

In this way, the record tracks are formed in partial overlap on the precedingly formed tracks, whereby the record track having a narrower width than the gap width of the magnetic heads 6' and 7' can be formed. By virture of the record track array described above, there arises no lowering of the level of the reproduced signal due to tracking error even when the magnetic heads 6' and 7' are deviated in position in the direction widthwise of the recording track in the reproducing operation. Since the magnetic heads 6' and 7' have the respective gaps 61 and 62 which differ from each other in respect to the azimuth angle, the record tracks positioned adjacent to each other have mutually different directions of magnetization. When the record track is scanned for reproduction by the magnetic head having the gap of azimuth angle matches with the direction of magnetization of that record track, a part of the adjacent record track is also scanned by the magnetic head. However, because of the feature mentioned above, the video signal is prevented from being reproduced from the adjacent record track due to the azimuth loss.

Also in the case of the instant embodiment, the writing and reading timing in the recording and reproducing operations is established on the basis of the tacho-signal produced by the tacho-signal generator 34, as is the case of the preceding embodiments. In the case of the instant embodiment, however, the recording or reproducing operation is performed at the same timing on the field-by-field basis since the two magnetic heads 6' and 7' are operated simultaneously.

Further, it is not always necessary to operate the memory unit 220 of the time axis conversion circuit 22 in such a manner in which the writing is initiated starting from the first address of the memory unit 220 when the magnetic head 6' has reached the point Q in the recording operation, while the writing is initiated starting from the first address of the memory unit at the moment when the magnetic head 6 has attained the point P in the reproducing operation. It is also possible to arrange such that the address from which the reading is to be started in the memory unit is designated on the basis of the address at which the writing has been made at the time when the magnetic head 6' has reached the point P in the recording operation, while the address from which the writing is to be started is designated on the basis of the address from which the reading was made when the magnetic head 6' had attained the position or point P in the reproducing operation. In the latter case, the writing can be made in continuation starting from the address which is found at the moment the magnetic head 6' has attained the point Q in the recording operation without returning to the first address of the memory unit, while in the reproducing operation, the writing can be made continuously starting from the address found at the time when the magnetic head 6' has attained the point Q without returning to the first address of the memory unit.

Figure 15:
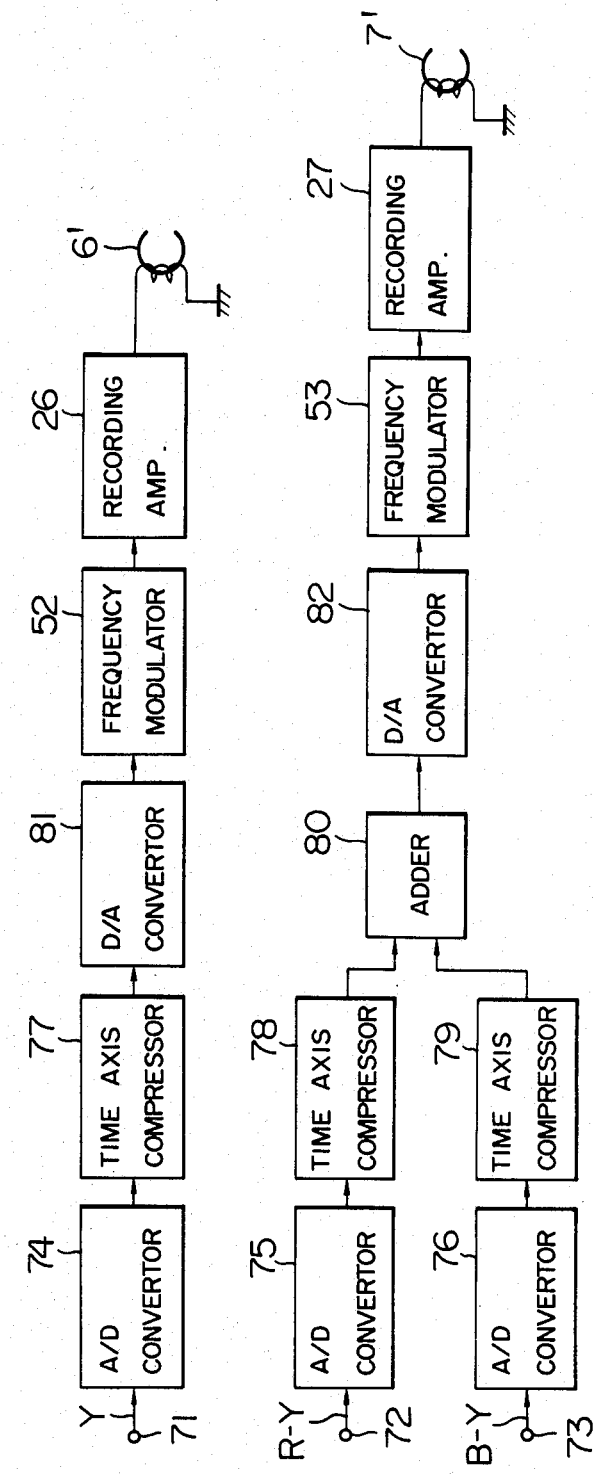
FIG. 15 is a block diagram showing an arrangement of a recording circuit according to a further embodiment of the invention.

FIG. 15 shows in a block diagram another embodiment of the magnetic recording circuit according to the present invention, in which 71, 72 and 73 denote input terminals supplied with a luminance signal and a pair of color difference signals, respectively, 74, 75 and 76 denote analog-to-digital (A/D) conversion circuits, respectively, 77, 78 and 79 denote time axis compression circuits, respectively, each of which is composed of the memory driver circuit 223 and the random access memory 225 of the circuit shown in FIG. 6. A reference numeral 80 denotes a mixing or adding circuit for mixing two types of the time-axis-compressed color difference signals.

In FIG. 15, the luminance signal Y is supplied to the analog-to-digital (A/D) conversion circuit 74 from the input terminal 71 to be outputted therefrom as the digital luminance signal which is supplied to the time axis compression circuit 77. The latter is designed to perform the time-axis compressing operation same as that performed by the time axis conversion circuit 22 shown in FIG. 11. The time-axis-compressed digital luminance signal output from the circuit 77 is supplied to the digital to analog (D/A) converter 81. The time-axis-compressed analog luminance signal thus obtained is recorded in the form of FM luminance signal by the mangetic head 6' in the similar manner as is in the case of the embodiment shown in FIG. 11.

On the other hand, one of the color difference signals, e.g. the R-Y signal is supplied to the A/D converter 75 from the input terminal 72 to be subsequently supplied to the time axis compression circuit 78 as the digital R-Y signals. The other color difference signal, e.g. the B-Y signal, is supplied to the A/D converter 76 from the input terminal 73 to be subsequently supplied to the time axis compression circuit 79 as the digital B-Y signal. The digital R-Y signal and the digital B-Y signal both of which have undergone the time axis compression are mixed by the mixer or adder circuit 80 into a digital chrominance signal which is the supplied to the D/A converter 82 to be converted into the time-axis-compressed analog chrominance signal. This analog chrominance signal is recorded by the magnetic head 7' on the magnetic tape in the form of FM chrominance signal in the same manner as in the case of the embodiment shown in FIG. 11.

Through cooperation of the time axis compression circuits 78 and 79 and the mixer or adder circuit 80, the R-Y signal and the B-Y signal can be multiplexed on the time division basis. To this end, it is taught that the reading speed of the time axis compression circuits 78 and 79 is selected twice as high as that of the time axis compression circuit 77 and that the R-Y signal and the B-Y signal each of which has a single horizontal scanning period are read out alternately from the time axis compression circuits 78 and 79. As the result of this, the time-axis-compression R-Y and B-Y signals are serially arrayed within the period corresponding to the single horizontal scanning period of the time-axis-compressed luminance signal, whereby the time-division multiplexed signal of the R-Y and B-Y signals is obtained.

The instant embodiment can be advantageously used for recording and reproducing the luminance signal and the two color difference signals derived from a color video camera. However, the invention is not restricted to such application.

FIG. 16 shows in a waveform diagram an example of the time-axis-compressed chrominance or color singal outputted by the D/A converter 82. It will be seen that the R-Y signal component is located within a period $T_1$ included in the single horizontal scanning period $T_H$ with the B-Y signal being located within a period $T_2$ also included by the horizontal scanning period $T_H$, to thereby constitute the time-division multiplexed chrominance signal.

In this connection, it should be mentioned that a position marking signal 27 may be added at the beginning of each horizontal scanning period $T_H$, as is shown in FIG. 16. This position marking signal can be used for matching the phases of the luminance signal and the individual color difference signals with each other in the reproducing operation. More specifically, the luminance signal and the chrominance signal recorded with the aid of the recording circuit shown in FIG. 15 are expanded in respect to the time axis thereof by the respective time axis expansion circuits. Accordingly, by adding the similar position marking signal to the luminance signal as well, the timings at which the luminance and chrominance signals are read out from the respective time axis expansion circuits can be made to coincide with each other by using the position marker signals attached to the luminance signal and the chrominance signal, to thereby accomplish the matching of phases of these signals.

In the above description of the circuit shown in FIG. 15, it has been assumed that the R-Y signal and the B-Y signal are multiplexed on a time division basis after the time axis compression of these signals. However, it is of course possible that the R-Y signal and the B-Y signal are first combined into the line sequential or serial signal which then undergoes the time axis compression.

In the embodiment described above, the magnetic heads 6' and 7' are disposed very closely to each other. Even when these magnetic heads are disposed with a space in some degree, the recording and reproduction of the color video signal can be accomplished in the same manner as in the case of the preceding embodiments by increasing the wrap angle at which the magnetic tape 1 is wound around the head cylinder 5 by an angle corresponding to the distance between the magnetic heads 6' and 7'.

Further, the invention is not restricted to such arrangement that the FM luminance signal and the FM chrominance signal are simultaneously supplied to the magnetic heads 6' and 7', respectively. More specifically, since each of the time axis compression circuits 78 and 79 shown in FIG. 15 can be constituted by the memory unit, the luminance signal and the chrominance signal can be recorded starting from the same position in the direction widthwise of the magnetic tape by delaying the timing at which the time axis compression circuit 77 is read out for a time determined by dividing the distance between the magnetic heads 6' and 7' by the scanning speed. Although this results in that the storage capacity of the memory unit is increased by a quantity corresponding to the above mentioned delay or difference in the timing for reading of the memory unit constituting the time axis compression circuit 77, such increase in the storage capacity is to a negligible degree unless the distance between the magnetic heads 6' and 7' is selected excessively great. In the reproducing operation, the timing at which the luminance signal is read out from the memory unit constituting the associated time axis expansion circuit may be similarly delayed relative to the timing at which the chrominance signal is read out from the memory unit constituting the associated time axis expansion circuit, to thereby accomplish the phase matching between the luminance signal and the chrominance signal. Of course, the positioning or indexing signal shown in FIG. 16 can be made use of to this end.

Figure 17:
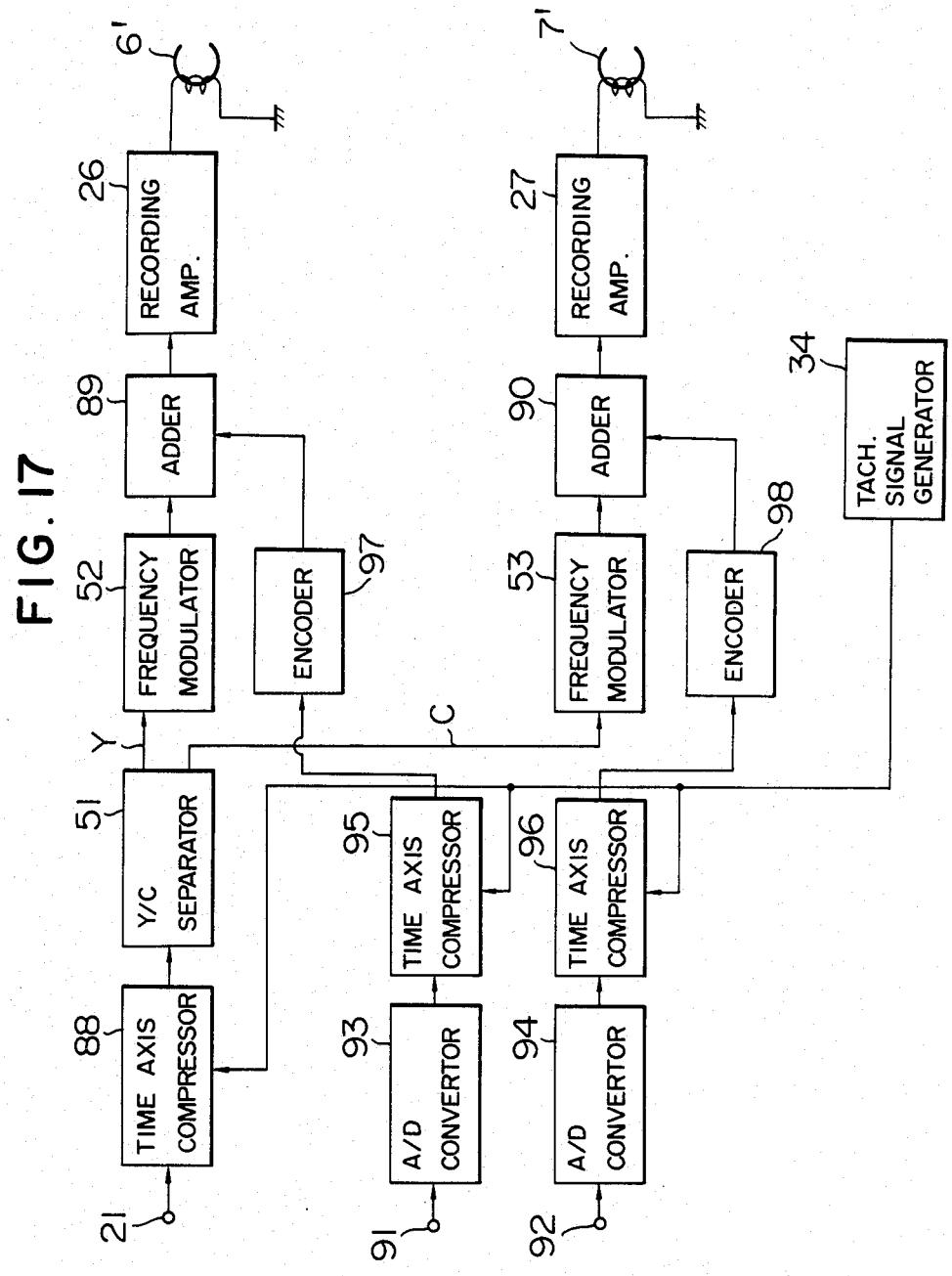
FIG. 17 is a block diagram showing a recording circuit according to still another embodiment of the invention.

FIG. 17 shows in a block diagram a recording circuit according to a further embodiment of the invention, wherein a numeral 88 denotes the time axis compression circuit, 89 and 90 denote adder circuits, 91 and 92 denote input terminals for sound signal, 93 and 94 denote analog-to-digital (A/D) converter circuits, and 97 and 98 denote encoder circuits, respectively. In FIG. 17, parts corresponding to those shown in FIG. 11 are designated by like reference symbols.

Operation of this recording circuit will be described below.

Referring to FIG. 17, a color video signal of a standard system applied to the input terminal 21 is supplied to the time axis compression circuit 88 to undergo the time axis compression on the field-by-field basis as is in the case of the preceding embodiments. The output signal from the time axis compression circuit 88 is supplied to a separator circuit 51 to be separated into a luminance signal Y and a chrominance signal C, which are subsequently modulated by frequency modulators 52 and 53 and supplied to adder circuits 89 and 90, respectively.

On the other hand, a left-channel sound signal component and a right-channel sound signal component of a stereophonic signal applied to the input terminals 91 and 92 are converted into digital sound signals through the D/A converters 93 and 94 and subsequently supplied to the time axis compression circuits 95 and 96, respectively. The time-axis-compressed sound signals outputted from the circuits 95 and 96 are supplied to the encoder circuits 97 and 98, respectively, to be converted into codes suited for the recording and reproduction (e.g. through frequency modulation) and subsequently supplied to the adder circuits 89 and 90, respectively.

The FM luminance signal and the digital sound signal of left channel are added together on the time division basis through the adder circuit 89 and supplied to the magnetic head 6' after having been amplified by the recording amplifier circuit 26. In the similar manner, the FM chrominance signal and the digital sound signal of the right channel are added together on the time division basis by the adder circuit 90 to be supplied to the magnetic head 7' after having been amplified by the recording amplifier cirucit 27.

FIGS. 18a, 18b and 18c illustrate in timing charts a concrete example of the time axis compression and multiplexing of the luminance signal and the left-channel sound signal, wherein reference numerals 159, 160, 161 and 162 of FIG. 18a denote the individual fields of the luminance signal of the standard system, and numerals 163, 164 and 165 of FIG. 18c denote the left-channel sound signals each of a period corresponding to one field in standard system. FIG. 18b illustrates timing at which the luminance signal (FIG. 18a) and the left-channel sound signal (FIG. 18c) undergo the time axis compression and multiplexing operation.

In the instant embodiment, the time axis compression circuit 88 (FIG. 17) is designed to exhibit a greater ratio of compression as compared with the time axis compression circuits 22 and 77 shown in FIGS. 11 and 15, respectively, to thereby correspondingly shorten the luminance signal recording tracks formed on the magnetic tape so that the time-axis-compressed left-channel sound signal may be recorded in the blank portion or margin thus available on the magnetic tape.

Referring to FIG. 18a, the fields 159, 160, 161 and 162 of the luminance signal are compressed in the time axis thereof through the time axis compression circuit 88 to be converted into the luminance signal fields 159', 160', 161' and 162' shown in FIG. 18b.

On the other hand, the left-channel sound signal 163 of the one-field period $T_f$ corresponding to the field 159 of the luminance signal undergoes the time axis compression in the time axis compression circuit 95 (FIG. 17) to be located as the time-axis-compressed sound signal 163' at a position preceding in time to the time-axis-compressed luminance signal 160'. In the similar manner, the left-channel sound signals 164 and 165 each of the one-field period are disposed as the time-axis-compressed sound signals 164' and 165' at positions preceding chronographically to the time-axis-compressed luminance signals 161' and 162', respectively. In this connection, it should be noted that the ratio of time axis compression of the time axis compression circuits 88 and 95 (FIG. 17) as well as the timing for the reading operation are so selected that a pair of the time-axis-compressed sound signal and luminance signal such as, for example, the time-axis-compressed sound signal 163' and luminance signal 160' may be present within the period during which the magnetic head 6' scans the magnetic tape from the point P to the point Q shown in FIG. 10a.

Assuming that the frequency band capable of being recorded and reproduced is 4 MHz and that the left-channel sound signal is sampled at 30 KHz and undergoes pulse code modulation (PCM) with eight bits, the PCM sound signal as obtained contains 240 bits per second. Accordingly, the ratio of time axis compression of the circuit 95 may be selected equal to about 1/20. Since one field of NTSC system includes 262.5 horizontal scanning lines, the PCM sound signal can be recorded within a period corresponding to about 13 horizontal scanning lines in the NTSC system.

The time axis compression and multiplexing mentioned above can be course be effected for the chrominance signal and the right-channel sound signal.

FIG. 19 is a view illustrating a pattern of the record tracks thus formed, wherein numerals 125 and 127 denote the record tracks formed by the magnetic head 6' while 126 and 128 denote the record tracks formed by the magnetic head 7'. The luminance signal is recorded in a regions 166. The chrominance signal is recorded in regions 167. The left-channel sound signal is recorded in regions 168. The right-channel sound signal is recorded in regions 169. Reference numerals 170 and 171 denote guard bands.

As will be seen in FIG. 19, the left- and right-channel sound signals are recorded on the same tracks as the luminance signal and the chrominance signal, respectively. In this case, 0.5 to 4 horizontal scanning periods H are provided between the individual record tracks. By providing the guard bands or regions each of a period corresponding to the above mentioned number of the horizontal scanning periods between the luminance-signal recording region 166 and the left-channel sound signal recording region 168 on one hand and between the chrominance signal recording region 167 and the right-channel sound signal recording region 169 on the other hand, deterioration of the luminance signal and chrominance signal can be positively prevented. Further, since the record tracks are so formed that the partial overlap is produced between the adjacent ones, as described hereinbefore in conjunction with FIG. 14, there will not occur such unwanted situation in which the sound signal remains partially unerased. Further, when the left- and right-channel sound recording regions 168 and 169 are formed on the extensions of the luminance signal recording region 166 and the chrominance signal recording region 167, the ratio at which these regions occupy the record tracks 125, 126, 127 and 128 is on the order of 1/20. Accordingly, the ratio of time axis compression of the circuit 88 (FIG. 17) is decreased only a little when compared with the case in which the left- and right-channel sound signals 168 and 169 are not recorded. Correspondingly, the recorded signal frequency of the luminance signal, the chrominance signal and others will not be increased to any appreciable degree.

FIGS. 20a, 20b and 20c show timing diagrams for illustrating, by way of example, the time axis expansion effected in the reproduction of the luminance signal and the left-channel sound signal recorded in the manner described above. Parts corresponding to those shown in FIG. 18 are denoted by like reference symbols.

Referring to the figures, the time-axis-compressed luminance signals 159', 160', 161' and 162' are expanded in the time axis so as to have a time duration equal to the one-field period $T_f$ of standard system, respectively, whereby fields 159, 160, 161 and 162 of the standard luminance signal are reconstituted. In the similar manner, the time-axis-compressed left-channel sound signals 163', 164' and 165' are also expanded in the time axis so as to have the time duration equal to the one-field period $T_f$ of standard system, respectively, whereby the left-channel sound signal of the original time axis (FIG. 20c) can be obtained.

In this case, the time-axis-compressed left channel sound signal 163', for example, corresponds to the time-axis-compressed luminance signal 159', both of which signals should coincide with each other in the timing after the time axis expansion. However, there is difference in time which amounts to about one field between the time-axis-expanded luminance signal and the left-channel sound signal. In practice, however, such difference in time will not involve any unnaturalness in the relation between the reproduced picture and sound.

The time-axis-expanding procedure mentioned above applies of course to the chrominance signal and the right-channel sound signal.

In the reproducing operation, the processing may be performed in the direction reverse to the operation of the circuit shown in FIG. 17. Accordingly, any further description will be unnecessary. It should however be mentioned that separation of the luminance signal and the left-channel sound signal as well as separation of the luminance signal and the left-channel sound signal as well as separation of the chrominance signal and the right-channel sound signal is carried out by utilizing the tacho-signal produced by the tacho-signal generator 34 as the switching timing signal.

In the above description, it is assumed that the sound signal is stereophonic. It should however be noted that the sound signals as recorded may be two separate sound signals. Since these two sound signals are recorded separately on the respectively associated record tracks, one of the sound signals may be recorded later on. In otherwords, both or one of the sound signals may be rewritten without involving any deterioration in the recorded color video signal.

In the case of the embodiment described above, the continuous color video signal undergoes the time axis conversion in the recording and reproducing operation. In case the video tape recorder is integrally combined with a color video camera, similar effect can be attained without providing especially the time axis conversion circuit, since the storage function inherent to the color video camera can be made use of to this end.

FIG. 21 shows in a block diagram a recording circuit combined with a video camera according to still another embodiment of the invention, wherein a reference numeral 84 denotes a color video camera, 85 denotes a matrix circuit, 52, 53a and 53b denote frequency modulating circuits, respectively, and 86 denotes an adder circuit.

Operation of this recording circuit will be described below.

Also in this recording circuit, the structure described in conjunction with FIGS. 10a and 10b is adopted. Operation of the color video signal is synchronized with the video tape recorder with the aid of the tacho-signal produced by the tacho-signal generator 34. The color video camera 84 exhibits a storage or memory function to hold a picked-up image of an object for a predetermined time and scans one field inclusive of the vertical blanking period during the scanning rotation of the magnetic head 6' from the point P to the point Q. The start of the scanning is controlled by the tacho-signal and corresponds to the time point at which the magnetic head 6' has reached the point P. During the period $\Delta T$ ($=T_f\theta°/360°$) shown in FIG. 12b, no scanning is carried out. In other words, the scanning is intermittently performed on the field-by-field basis.

The primary color signals R, G and B obtained from the color video camera 84 are supplied to the matrix circuit 85, resulting in that a luminance signal Y and two color difference signals R-Y and B-Y are derived. The luminance signal Y is modulated through the frequency modulating circuit 52 and supplied to the magnetic head 6' after having been amplified by the recording amplifier circuit 26. On the other hand, the color difference signals R-Y and B-Y are modulated through the respective frequency modulators 53a and 53b to be subsequently added together in the adder circuit 86, the synthesized output of which is supplied to the magnetic head 7' after having been amplified by the recording amplifier 27. The frequency modulators 53a and 53b have carried frequencies which differ from each other. Thus, the chrominance or color signal composed of the MF color difference signals R-Y and B-Y multiplexed on the frequency division basis is obtained from the adder circuit 86.

It will be appreciated that any especial time axis compression circuit is not required in the recording operation. In the reproducing operation, the chrominance or color signal picked up by the magnetic head 7' is separated into the two color difference signals by means of filters matched with the carrier frequencies employed in the recording operation, wherein the luminance signal reproduced through the magnetic head 6' and the two color difference signals are subjected to the time axis expansion after the frequency demodulations, respectively.

For multiplexing the two color difference signals R-Y and B-Y, line sequential multiplexing may be adopted in place of the multiplexing on the frequency division basis. Further, the time axis compression circuits may be provided for the color difference signal R-Y and B-Y, respectively, to thereby multiplex these signals before frequency modulation in the manner described hereinbefore in conjunction with FIG. 16.

In the case of the instant embodiment, the record tracks formed by the magnetic heads 6' and 7' are arrayed in a pattern similar to that shown in FIG. 13.

In the foregoing, several embodiments of the invention which are destined for simultaneous signal recording by means of two magnetic heads have been described. The pattern of the record tracks shown in FIG. 13 is utterly identical with the pattern of record tracks on which the luminance signal and the chrominance signal are recorded at mutually different azimuth angles by the conventional two-head helical scan type video tape recorder in which the magnetic tape is wound around the head cylinder over ca. 180° as is in the case of the preceding embodiments in which two magnetic heads are alternately changed over for every rotation.

In other words, the magnetic tape on which the record tracks are formed in the pattern shown in FIG. 13 by the video tape recorder according to any given one of the embodiments described above can be reproduced with a video tape recorder in which a head cylinder having a diameter greater than that of the head cylinder 5 of the video tape recorder according to the invention by a factor of about $2 \times (360° - \theta°)/360°$ and having two magnetic heads mounted at an angular distance of 180° therebetween is used. In this case, the time axis expanding means for the reproducing operation is rendered unnecessary. In particular, in case the recording is made by using the recording circuit shown in FIG. 21 while the reproduction is performed by the magnetic heads disposed at the angular distance of 180° therebetween, it is unnecessary to provide especially the circuit for time axis conversion either for recording or reproducing operation.

The helical scan type video tape recorder apparatus according to the present invention allows the diameter of the head cylinder to be decreased about a half as compared with that of the hitherto known helical scan type video tape recorder operative on the same principle as the two-head helical scan type recorder. By virtue of this feature, the tape recorder apparatus can be inexpensively manufactured in small size and light weight and is particularly suited for integral combination with a video camera.

We claim:

1. A video signal recording/reproducing apparatus of helical-scan type, in which a video signal is recorded on a magnetic tape in successive tracks which are inclined to the longitudinal direction of the tape, comprising:

a rotary cylinder around which said magnetic tape travels by more than 180 degrees of rotation angle of the cylinder along a helical path and means for rotating said cylinder in synchronism with the field period of said video signal;

a pair of magnetic heads disposed on said rotary cylinder so as to trace said recording tracks on said magnetic tape as said cylinder rotates, said heads having gaps whose azimuth angles which are different from each other, said magnetic heads being disposed at an interval of other than 180 degrees of the rotation angle of the rotary cylinder;

first means for converting the video signal during a head rotation period into a video signal having a time period corresponding to the period during which said magnetic tape is scanned by said magnetic heads for each rotation of said rotary cylinder; and second means for applying the converted video signal to said magnetic heads for recording on said magnetic tape.

2. A video signal recording/reproducing apparatus according to claim 1, wherein said second means includes third means for supplying said converted video signal provided by said first means to said pair of magnetic heads alternately for every cylinder rotation period.

3. A video signal recording/reproducing apparatus according to claim 1, wherein said first means further includes separating means for separating the luminance signal component and chrominance signal component of said video signal from each other and for supplying substantially simultaneously said luminance signal component and said chrominance signal component to respective ones of said pair of magnetic heads so as to form substantially simultaneously two different record tracks for said luminance signal and said chrominance signal, respectively.

4. A video signal recording/reproducing apparatus according to claim 1, wherein said first means is constituted by time-axis compressing means.

5. A video signal recording/reproducing apparatus according to claim 2, wherein said first means is constituted by time-axis compressing means.

6. A video signal recording/reproducing apparatus according to claim 3, wherein said first means is constituted by time-axis compressing means.

7. A video signal recording/reproducing apparatus according to claim 1, wherein said first means is constituted by a video camera apparatus which outputs video signal having a frame period within the period during which said magnetic heads scan said magnetic tape.

8. A video signal recording/reproducing apparatus according to claim 2, wherein said first means is constituted by a video camera apparatus which outputs video signal having a frame period within the period during which said magnetic heads scan said magnetic tape.

9. A video signal recording/reproducing apparatus according to claim 3, wherein said first means is constituted by a video camera apparatus which outputs video signal having a frame period within the period during which said magnetic heads scan said magnetic tape.

* * * * *